US011706099B2

(12) United States Patent
Chitalia et al.

(10) Patent No.: US 11,706,099 B2
(45) Date of Patent: Jul. 18, 2023

(54) MONITORING AND POLICY CONTROL OF DISTRIBUTED DATA AND CONTROL PLANES FOR VIRTUAL NODES

(71) Applicant: Juniper Networks, Inc., Sunnyvale, CA (US)

(72) Inventors: Harshit Naresh Chitalia, Sunnyvale, CA (US); Travis Gregory Newhouse, Encinitas, CA (US); Sumeet Singh, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 849 days.

(21) Appl. No.: 16/024,108

(22) Filed: Jun. 29, 2018

(65) Prior Publication Data

US 2020/0007405 A1 Jan. 2, 2020

(51) Int. Cl.
*H04L 41/14* (2022.01)
*H04L 41/22* (2022.01)
*G06F 3/0481* (2022.01)

(52) U.S. Cl.
CPC .............. *H04L 41/14* (2013.01); *H04L 41/22* (2013.01); *G06F 3/0481* (2013.01)

(58) Field of Classification Search
CPC ........ H04L 41/14; H04L 41/22; G06F 3/0481
(Continued)

(56) References Cited

U.S. PATENT DOCUMENTS 8,612,612 B1 * 12/2013 Dukes ...................... H04L 67/14
370/230
8,953,439 B1 * 2/2015 Lin ...................... G06F 11/1438
370/219

(Continued)

FOREIGN PATENT DOCUMENTS

WO 2013/184846 A1 12/2013

OTHER PUBLICATIONS

Q. Wang, G. Shou, Y. Liu, Y. Hu, Z. Guo and W. Chang, "Implementation of Multipath Network Virtualization With SDN and NFV," in IEEE Access, vol. 6, pp. 32460-32470, 2018, doi: 10.1109/ACCESS.2018.2842058. (Year: 2018).*

(Continued)

*Primary Examiner* — Jeffrey R Swearingen
(74) *Attorney, Agent, or Firm* — Shumaker & Sieffert, P.A.

(57) ABSTRACT

A computing system includes a computing device configured to execute a plurality of virtual machines, each virtual machine of the plurality of virtual machines configured to provide control plane functionality for at least a different respective subset of forwarding units of a network device, the computing device distinct from the network devices. The computing system also includes a policy agent configured to execute on the computing device. The agent is configured to determine that a particular virtual machine of the plurality of virtual machines provides control plane functionality for one or more forwarding units of the network device; determine control plane usage metrics for resources of the particular virtual machine; and output, to a policy controller, data associated with the control plane usage metrics and data associating the particular virtual machine with the one or more forwarding units for which the particular virtual machine provides control plane functionality.

20 Claims, 10 Drawing Sheets

(58) Field of Classification Search
USPC .................................................. 709/217, 224
See application file for complete search history.

(56) References Cited

U.S. PATENT DOCUMENTS

| | | | | |
|---|---|---|---|---|
| 9,838,309 | B1* | 12/2017 | Ghosh | H04L 49/604 |
| 9,853,898 | B1* | 12/2017 | Subramanian | H04L 45/745 |
| 10,547,521 | B1* | 1/2020 | Roy | H04L 43/0817 |
| 10,728,121 | B1* | 7/2020 | Chitalia | H04L 41/0894 |
| 11,323,327 | B1* | 5/2022 | Chitalia | H04L 41/0893 |
| 2006/0230407 | A1* | 10/2006 | Rosu | G06F 9/5088 718/105 |
| 2014/0123212 | A1* | 5/2014 | Wanser | H04L 63/20 726/1 |
| 2014/0215077 | A1 | 7/2014 | Soudan et al. | |
| 2015/0200808 | A1* | 7/2015 | Gourlay | H04L 49/70 709/225 |
| 2015/0381384 | A1* | 12/2015 | Visser | H04L 63/0435 370/254 |
| 2016/0277249 | A1* | 9/2016 | Singh | H04L 41/50 |
| 2017/0111274 | A1* | 4/2017 | Bays | H04L 49/70 |
| 2017/0288981 | A1* | 10/2017 | Hong | H04L 41/0677 |
| 2018/0181348 | A1* | 6/2018 | Kusters | G06F 3/0665 |
| 2019/0342175 | A1* | 11/2019 | Wan | H04L 41/0816 |

OTHER PUBLICATIONS

U.S. Appl. No. 15/819,522, by Prasad Miriyala, entitled "Scalable Policy Management for Virtual Networks" filed Nov. 21, 2017.

U.S. Appl. No. 15/846,400, by Harshit Naresh Chitalia, entitled "Multi-Cluster Dashboard for Distributed Virtualization Infrastructure Element Monitoring and Policy Control" filed Dec. 19, 2017.

U.S. Appl. No. 15/844,338, by Babu Singaryan, entitled "Connecting Virtual Nodes in a Network Device Using Abstract Fabric Interfaces" filed Dec. 15, 2017.

Chowdhury et al., "PayLess: A Low Cost Network Monitoring Framework for Software Defined Networks," IEEE Network Operations and Management Symposium (NOMS), IEEE, May 5, 2014, 9 pp.

Shah et al., "An Adaptive Load Monitoring Solution for Logically Centralized SDN Controller," 18th Asia-Pacific Network Operations and Management Symposium (APNOMS), IEICE, Oct. 5, 2016, 6 pp.

Isolani et al., "Interactive Monitoring, Visualization, and Configuration of OpenFlow-Based SDN," IFIP/IEEE International Symposium on Integrated Network Management (IM), May 15, 2015, 9 pp.

Gutierrez-Aguado et al., "IaaSMon: Monitoring Architecture for Public Cloud Computing Data Centers," Springer, Journal of Grid Computing, vol. 14, No. 2, Mar. 4, 2016, 15 pp.

Extended Search Report from counterpart European Application No. 19180278.4, dated Nov. 4, 2019, 10 pp.

Response filed Jul. 1, 2020 to the Extended Search Report from counterpart European Application No. 19180278.4, dated Nov. 4, 2019, 25 pp.

Communication pursuant to Article 94(3) from counterpart European Application No. 19180278.4, dated Dec. 9, 2021, 4 pp.

Juniper Networks, "AppFormix Network Monitoring and Analytics with Streaming Telemetry", Juniper Networks, Inc., Apr. 1, 2018, 5 pp. UR: http://www.wdn.com.np/storage/product/Juniper/re1_1566536554.pdf.

Juniper Networks, "AppFormix User Guide", Juniper Networks, Inc., Aug. 31, 2017, 110 pp., URL: https://www.juniper.net/documentation/en_US/appformix/information-products/pathway-pages/pwp-appformix-reference-guide.pdf.

Juniper Networks, "Contrail Feature Guide", Juniper Networks, Inc., Jun. 13, 2016, 620 pp., URL: https://www.juniper.net/documentation/en_US/contrail2.21/information-products/pathway-pages/contrail-feature-guide-pwp.pdf.

Juniper Networks, "Contrail Service Orchestration User Guide", Juniper Networks, Inc., Jul. 25, 2017, 300 pp., URL: https://www.juniper.net/documentation/en_US/cso3.0/information-products/pathway-pages/user-guide.pdf.

Juniper Networks, "Junos Space Network Management Platform Complete Software Guide", Juniper Networks, Inc., Sep. 24, 2020, pp. 1-400, URL: https://www.juniper.net/documentation/en_US/junos-space19.3/platform/information-products/pathway-pages/software-guide-junos-space-platform.pdf.

Summons to Attend Oral Proceedings Pursuant to Rule 115(1) EPC from counterpart European Application No. 19180278.4 dated Nov. 29, 2022, 9 pp.

Response to Communication pursuant to Article 94(3) EPC dated Dec. 9, 2021, from counterpart European Application No. 19180278.4 filed Apr. 13, 2022, 15 pp.

First Office Action and Search Report, and translation thereof, from counterpart Chinese Application No. 201910556605.1 dated Nov. 18, 2022, 12 pp.

Brief Communication from the Examining Division before Oral Proceedings in counterpart European Application No. 19180278.4, dated May 22, 2023, 4 pp.

Response to Summons to Attend Oral Proceedings pursuant to Rule 115(1) EPC dated Dec. 13, 2022, from counterpart European Patent Application No. 19180278.4, filed May 2, 2023, 41 pp.

Bament et al., "Designing Engineering Innovation & Simplicity into Network Slicing," https://blogs.juniper.net/en-us/service-provider-transformation/designing-engineering-innovation-simplicity-into-network-slicing, Feb. 20, 2018, 3 pp.

Bhaumik et al., "Software-Defined Optical Networks (SDONs): A Survey," Photonic Network Communications, vol. 28, Jun. 15, 2014, pp. 4-18.

Ordonez-Lucena et al., "Network Slicing for 5G with SDN/NFV: Concepts, Architectures, and Challenges," IEEE Communications Magazine, May 2017, pp. 80-87.

Vassilaras et al., "The Algorithmic Aspects of Network Slicing," IEEE Communications Magazine, Aug. 2017, pp. 112-119.

* cited by examiner

Composite Rules

| RULE NAME | THRESHOLD | DETAILS | DELETE |
|---|---|---|---|
| COMPOSITE-1 | ANY RULE | INCLUDES 4 RULES | ⚡ |

| RULE NAME | RULE DESCRIPTION |
|---|---|
| network_dev_in_error_rate | Generate network device alert for ifInErrors if average over 1s duration interval is above 0 in 1 of last 1 intervals. |
| network_dev_out_error_rate | Generate network device alert for ifOutErrors if average over 1s duration interval is above 0 in 1 of last 1 intervals. |
| network_dev_in_discard_rate | Generate network device alert for ifInDiscards if average over 1s duration interval is above 0 in 1 of last 1 intervals. |
| network_dev_out_discard_rate | Generate network device alert for ifOutDiscards if average over 1s duration interval is above 0 in 1 of last 1 intervals. |

Dashboard
Charts
Alarms
Rules
Plan
Reports
Chargeback
Network Topology
Settings

◀ Alarms (2)

Add Composite Rule

Name: Enter name:

Scope: Network Device ▲▼

When: Any selected rule is ▲▼ active.

Rule List
network_dev_error_in_rate
network_dev_error_out_rate
network_dev_in_discard_rate
network_dev_out_discard_rate

MONITORING AND POLICY CONTROL OF DISTRIBUTED DATA AND CONTROL PLANES FOR VIRTUAL NODES

TECHNICAL FIELD

This disclosure relates to monitoring and improving performance of cloud data centers and networks.

BACKGROUND

Virtualized data centers are becoming a core foundation of the modern information technology (IT) infrastructure. In particular, modern data centers have extensively utilized virtualized environments in which virtual hosts, such virtual machines or containers, are deployed and executed on an underlying compute platform of physical computing devices.

Virtualization with large scale data center can provide several advantages. One advantage is that virtualization can provide significant improvements to efficiency. As the underlying physical computing devices (i.e., servers) have become increasingly powerful with the advent of multicore microprocessor architectures with a large number of cores per physical central processing unit (CPU), virtualization becomes easier and more efficient. A second advantage is that virtualization provides significant control over the infrastructure. As physical computing resources become fungible resources, such as in a cloud-based computing environment, provisioning and management of the compute infrastructure becomes easier. Thus, enterprise IT staff often prefer virtualized compute clusters in data centers for their management advantages in addition to the efficiency and increased return on investment (ROI) that virtualization provides.

SUMMARY

In general, this disclosure describes techniques for monitoring and performance management for computing environments, such as virtualization infrastructures deployed within data centers. The techniques provide visibility into operational performance and infrastructure resources. As described herein, the techniques may leverage analytics in a distributed architecture to provide one or more of real-time and historic monitoring, performance visibility and dynamic optimization, to improve orchestration, security, accounting and planning within the computing environment. The techniques may provide advantages within, for example, hybrid, private, or public enterprise cloud environments. The techniques accommodate a variety of virtualization mechanisms, such as containers and virtual machines, to support multi-tenant, dynamic, and constantly evolving enterprise clouds.

Aspects of this disclosure relate to monitoring performance and usage of consumable resources shared among multiple different elements that are higher-level components of the infrastructure. In some examples, a network device (e.g., a router) may be logically divided into a control plane and data plane. The control plane may be executed by one or more control plane servers that are distinct (physically separate) from the network device. In other words, the network device may provide data plane functionality and a set of one or more servers that are physically separate from the network device may provide the control plane functionality of the network device. Moreover, data plane hardware resources (e.g., forwarding units) of a physical network device are partitioned and each assigned to different virtual nodes (also called "node slices"), and virtual machines of the servers are allocated to provide the functionality of the respective control planes of the virtual nodes of the network device. An agent installed at the control plane servers may monitor the performance and usage of the control plane servers. An agent may also be installed at a proxy server to monitor performance of the data plane functionality of the network device.

Because the control plane functionality of the network device may be divided across different control plane servers and/or different virtual machines executing at the control plane servers, the agents installed at the control plane servers may dynamically determine which virtual machines are running on each control plane server and determine a physical network device corresponding to the respective virtual machines. Responsive to determining which virtual machines are executing a control plane, the agents installed at the control plane servers may determine performance and/or usage of server resources attributed to each virtual machine, and thus for the associated virtual nodes. Similarly, agents installed at the data plane proxy server may obtain performance and resource usage data for the respective data plane forwarding units of the network device, and thus for the associated virtual nodes. The policy controller receives the data and correlates the control plane and data plane information for a given virtual node, to provide a full view of virtual node resource performance and usage in the node virtualization (node slicing) deployment.

The agents and/or a policy controller may determine whether the performance or resource utilization satisfies a threshold, which may indicate whether the control plane servers and/or network device forwarding resources associated with one or more virtual nodes are performing adequately. For example, the policy controller may output a set of rules, or policies, to the agents and the agents may compare the resource utilization to thresholds defined by the policies. In some examples, the policies define rules associated with the performance and resource utilization for the control plane as well as the data plane. Responsive to determining that one or more policies are not satisfied, the policy controller may generate an alarm to indicate a potential issue with a virtual node.

The policy controller may also generate one or more graphical user interfaces that enable an administrator to monitor the control plane functionality and data plane functionality of the virtual node as single logical device (e.g., rather than separate physical devices). In this way, the policy controller may simplify management of a virtual node which has functionality split between different physical devices.

The techniques may provide one or more advantages. For example, the techniques may enable an agent installed at a server executing a control plane for virtual node to dynamically determine the virtual machines executing at the server and identify the network device corresponding to the respective virtual machine. By identifying the network device corresponding to the virtual machine, a policy controller may combine performance data for the control plane and the data plane for a given virtual node into a single view. Further, the techniques may enable a controller to analyze virtual node performance data relating to a control plane of the virtual node, a corresponding data plane, or both. By analyzing the performance data and generating an alarm when a policy is not satisfied, the policy controller and/or agents may enable the policy controller to alter the distribution of computing resources (e.g., increasing a number of virtual machines associated with a virtual node's control plane) to improve performance of the virtual node within a network device.

In one example, a computing system includes a computing device configured to execute a plurality of virtual machines, each virtual machine of the plurality of virtual machines configured to provide control plane functionality for at least a different respective subset of forwarding units of a network device, the computing device distinct from the network devices. The policy agent is configured to execute on the computing device, and is configured to determine that a particular virtual machine of the plurality of virtual machines provides control plane functionality for one or more forwarding units of the network device. The policy agent is also configured to determine control plane usage metrics for resources of the particular virtual machine; and output, to a policy controller, data associated with the control plane usage metrics and data associating the particular virtual machine with the one or more forwarding units for which the particular virtual machine provides control plane functionality.

In one example, a method includes executing a plurality of virtual machines on a computing device and determining, by a policy agent executing on the computing device, that a particular virtual machine of the plurality of virtual machines provides control plane functionality for one or more forwarding units of a network device. The method also includes determining, by the policy agent, control plane usage metrics for resources of the particular virtual machine. The method further includes outputting, to a policy controller, data associated with the control plane usage metrics and data associating the particular virtual machine with the forwarding units for which the particular virtual machine provides control plane functionality, wherein the one or more forwarding units of the network device and the particular virtual machine form a single virtual routing node that appears, to external network devices, as a single physical routing node in a network.

In one example, a computer-readable storage medium includes instructions, that when executed by at least one processor of a computing device, cause the at least one processor to executing a plurality of virtual machines on the computing device and determine that a particular virtual machine of the plurality of virtual machines provides control plane functionality for one or more forwarding units of a network device. Execution of the instructions cause the at least one processor to determine control plane usage metrics for resources of the particular virtual machine and output data associated with the control plane usage metrics and data associating the particular virtual machine with the forwarding units for which the particular virtual machine provides control plane functionality, wherein the one or more forwarding units of the network device and the particular virtual machine form a single virtual routing node that appears, to external network devices, as a single physical routing node in a network.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

FIG. 7 illustrates an example user interface presented on a computing device, in accordance with one or more aspects of the present disclosure.

Like reference numerals refer to like elements throughout the figures and text.

DETAILED DESCRIPTION

Figure 1:
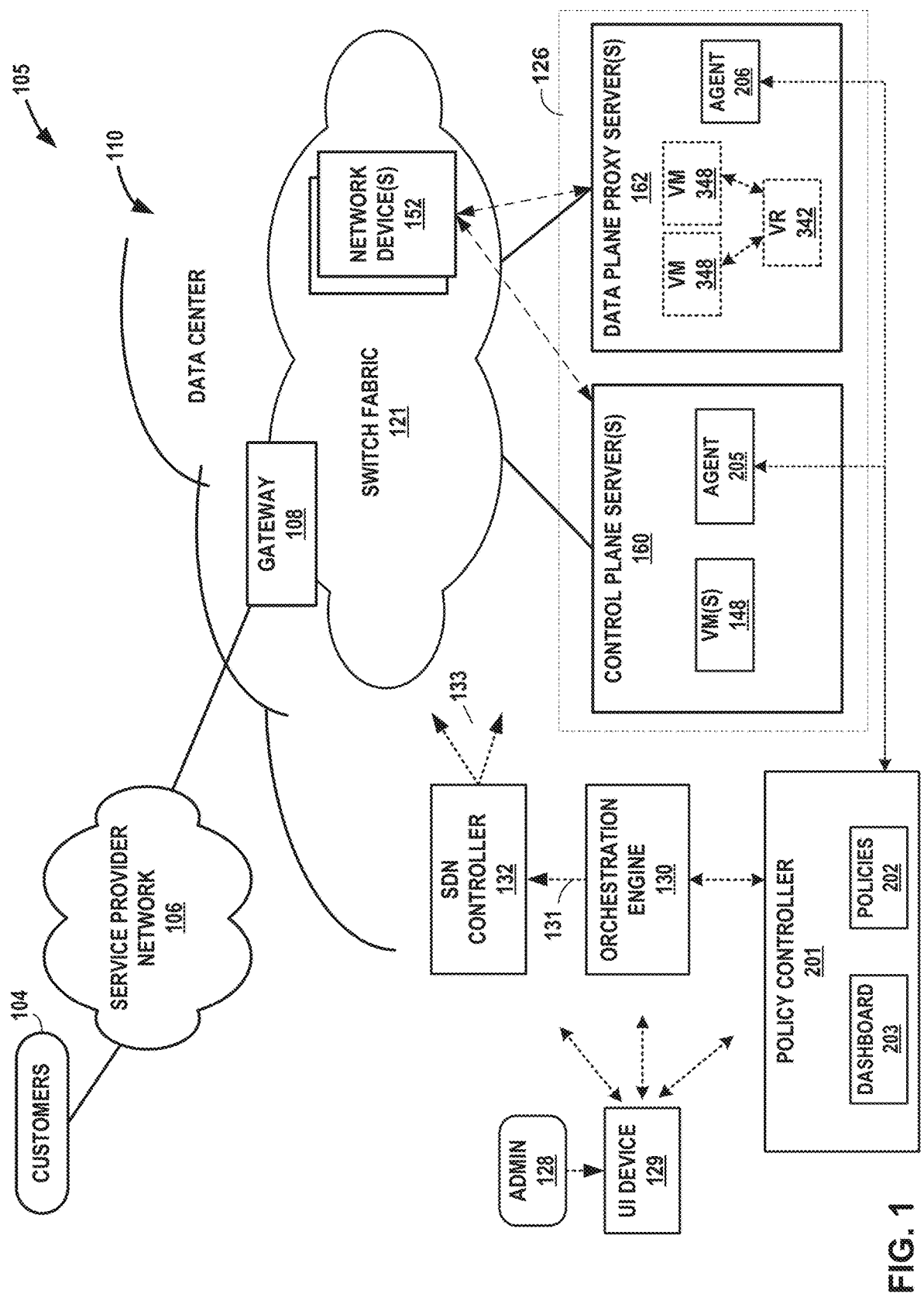
FIG. 1 is a conceptual diagram illustrating an example network that includes an example data center, in accordance with one or more aspects of the present disclosure.

FIG. 1 is a conceptual diagram illustrating an example network 105 that includes an example data center 110, in accordance with one or more aspects of the present disclosure. FIG. 1 illustrates one example implementation of network 105 and data center 110 that hosts one or more cloud-based computing networks, computing domains or projects, generally referred to herein as cloud computing cluster. The cloud-based computing clusters and may be co-located in a common overall computing environment, such as a single data center, or distributed across environments, such as across different data centers. Cloud-based computing clusters may, for example, be different cloud environments, such as various combinations of OpenStack cloud environments, Kubernetes cloud environments or other computing clusters, domains, networks and the like. Other implementations of network 105 and data center 110 may be appropriate in other instances. Such implementations may include a subset of the components included in the example of FIG. 1 and/or may include additional components not shown in FIG. 1.

In the example of FIG. 1, data center 110 provides an operating environment for applications and services for customers 104 coupled to data center 110 by service provider network 106. Although functions and operations described in connection with network 105 of FIG. 1 may be illustrated as being distributed across multiple devices in FIG. 1, in other examples, the features and techniques attributed to one or more devices in FIG. 1 may be performed internally, by local components of one or more of such devices. Similarly, one or more of such devices may include certain components and perform various techniques that may otherwise be attributed in the description herein to one or more other devices. Further, certain operations, techniques, features, and/or functions may be described in connection with FIG. 1 or otherwise as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

Data center 110 hosts infrastructure equipment, such as networking and storage systems, redundant power supplies, and environmental controls. Service provider network 106 may be coupled to one or more networks administered by other providers, and may thus form part of a large-scale public network infrastructure, e.g., the Internet.

In some examples, data center 110 may represent one of many geographically distributed network data centers. As illustrated in the example of FIG. 1, data center 110 is a facility that provides network services for customers 104. Customers 104 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some examples, data center 110 is an individual network server, a network peer, or otherwise.

Switch fabric 121 may include one or more single-chassis network devices 152, such as routers, top-of-rack (TOR) switches coupled to a distribution layer of chassis switches, and data center 110 may include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Switch fabric 121 may perform layer 3 routing to route network traffic between data center 110 and customers 104 by service provider network 106. Gateway 108 acts to forward and receive packets between switch fabric 121 and service provider network 106.

Single-chassis network device 152 is a router having a single physical chassis, which may be logically associated with a control plane (routing plane) and data plane (forwarding plane). In some examples, the functionality of the control plane and the data plane may be performed by single-chassis router 152. As another example, the functionality of the control plane may be distributed amongst one or more control plane servers 160 that are physically separate from single-chassis router 152. For example, the control plane functionality of single-chassis router 152 may be distributed among control plane servers 160 and the data plane functionality of single-chassis network device 152 may be performed by forwarding units of single-chassis router 152. In other words, the functionality of the control plane and the data plane may be performed utilizing resources in different computing devices.

In some examples, as illustrated in FIG. 1, data center 110 includes a set of storage systems and servers, including servers 126 interconnected via high-speed switch fabric 121 provided by one or more tiers of physical network switches and routers. Each of servers 126 may be alternatively referred to as a host computing device or, more simply, as a host. Servers 126 include one or more control plane servers 160 and one or more data plane proxy servers 162. Each of servers 126 may provide an operating environment for execution of one or more virtual machines 148 ("VMs" in FIG. 1) or other virtualized instances, such as containers. In the example of FIG. 1, control plane servers 160 include one or more VMs 148 and data plane proxy servers 162 optionally include a virtual router 142 and one or more VMs 148. Control plane servers 160 may provide control plane functionality of single-chassis server 152. In some examples, each VM 148 of control plane server 160 corresponds to and provides control plane functionality for a virtual routing node associated with one or more forwarding units or line cards (also referred to as flexible programmable integrated circuit (PIC) concentrators (FPCs)) of the data plane of a given one of network devices 152.

Each of servers 126 may execute one or more virtualized instances, such as virtual machines, containers, or other virtual execution environment for running one or more services. As one example, a network device 152 has its data plane hardware resources (e.g., forwarding units) partitioned and each assigned to different virtual nodes (also called "node slices"), and different virtual machines are assigned to provide the functionality of the respective control planes of the virtual nodes of a network device 152. Each control plane server 160 may virtualize the control plane functionality across one or more virtual machines to provide control plane functionality for one or more virtual nodes, thereby partitioning software resources of the control plane server 160 among the virtual nodes. For example, node virtualization allows for partitioning software resources of a physical control plane server 160 and hardware resources of a physical router chassis data plane into multiple virtual nodes. In the example of FIG. 1, each VM of VMs 148 may be considered a control plane for a virtual node. Virtualizing respective network devices 152 in to multiple virtual nodes may provide certain advantages, such as providing the ability to run multiple types of network device, isolate functions and services, and streamline capital expenses. Distributing the control plane of virtual nodes of network devices 152 across multiple virtual machines may provide redundant control and redundantly maintain the routing data, thereby providing a more robust and secure routing environment.

In this manner, a first subset of a plurality of forwarding units of network device 152 and a first one of virtual machines 148 operate as a first virtual routing node, and wherein a second subset of the plurality of forwarding units of network device 152 and a second one of virtual machines 148 operate as a second virtual routing node, such that each of the first virtual routing node and the second virtual routing node appears, to external network devices (such as gateway 108), as a respective single physical routing node in a network such as switch fabric 121. Example aspects of node virtualization are described in U.S. Ser. No. 15/844,338, entitled "CONNECTING VIRTUAL NODES IN A NETWORK DEVICE USING ABSTRACT FABRIC INTERFACES," filed Dec. 15, 2017, the entire contents of which are incorporated by reference herein.

Software-Defined Networking ("SDN") controller 132 provides a logically and in some cases physically centralized controller for facilitating operation of one or more virtual networks within data center 110 in accordance with one or more examples of this disclosure. The terms SDN controller and Virtual Network Controller ("VNC") may be used interchangeably throughout this disclosure. In some examples, SDN controller 132 operates in response to configuration input received from orchestration engine 130 via northbound API 131, which in turn operates in response to configuration input received from an administrator 128 operating user interface device 129. Additional information regarding SDN controller 132 operating in conjunction with other devices of data center 110 or other software-defined network is found in International Application Number PCT/

US 2013/044378, filed Jun. 5, 2013, and entitled PHYSICAL PATH DETERMINATION FOR VIRTUAL NETWORK PACKET FLOWS, which is incorporated by reference as if fully set forth herein.

User interface device 129 may be implemented as any suitable computing system, such as a mobile or non-mobile computing device operated by a user and/or by administrator 128. User interface device 129 may, for example, represent a workstation, a laptop or notebook computer, a desktop computer, a tablet computer, or any other computing device that may be operated by a user and/or present a user interface in accordance with one or more aspects of the present disclosure.

In some examples, orchestration engine 130 manages functions of data center 110 such as compute, storage, networking, and application resources. For example, orchestration engine 130 may create a virtual network for a tenant within data center 110 or across data centers. Orchestration engine 130 may attach virtual machines (VMs) to a tenant's virtual network. Orchestration engine 130 may connect a tenant's virtual network to an external network, e.g. the Internet or a VPN. Orchestration engine 130 may implement a security policy across a group of VMs or to the boundary of a tenant's network. Orchestration engine 130 may deploy a network service (e.g. a load balancer) in a tenant's virtual network.

In some examples, SDN controller 132 manages the network and networking services such load balancing, security, and allocate resources from servers 126 to various applications via southbound API 133. That is, southbound API 133 represents a set of communication protocols utilized by SDN controller 132 to make the actual state of the network equal to the desired state as specified by orchestration engine 130. For example, SDN controller 132 implements high-level requests from orchestration engine 130 by configuring physical switches, e.g. TOR switches, chassis switches, and switch fabric 121; physical routers; physical service nodes such as firewalls and load balancers; and virtual services such as virtual firewalls in a VM. SDN controller 132 maintains routing, networking, and configuration data within a state database.

Typically, the traffic between any two network devices, such as between network devices 152 within switch fabric 121, between control plane servers 160 and network devices 152, or between data plane proxy servers 162 and network devices 152, for example, can traverse the physical network using many different paths. For example, there may be several different paths of equal cost between two network devices. In some cases, packets belonging to network traffic from one network device to the other may be distributed among the various possible paths using a routing strategy called multi-path routing at each network switch node. For example, the Internet Engineering Task Force (IETF) RFC 2992, "Analysis of an Equal-Cost Multi-Path Algorithm," describes a routing technique for routing packets along multiple paths of equal cost. The techniques of RFC 2992 analyze one particular multipath routing strategy involving the assignment of flows to bins by hashing packet header fields that sends all packets from a particular network flow over a single deterministic path.

For example, a "flow" can be defined by the five values used in a header of a packet, or "five-tuple," i.e., the protocol, Source IP address, Destination IP address, Source port, and Destination port that are used to route packets through the physical network. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In the example of FIG. 1, data center 110 further includes a policy controller 201 that provides monitoring, scheduling, and performance management for data center 110. Policy controller 201 interacts with policy agents 205, 206 that are deployed within at least some of the respective physical servers 126 for monitoring resource usage of the physical compute nodes as well as any virtualized host, such as VM 148, executing on the physical host. In this way, policy agents 205, 206 provide distributed mechanisms for collecting a wide variety of usage metrics as well as for local enforcement of policies installed by policy controller 201. In example implementations, policy agents 205, 206 run on the lowest level "compute nodes" of the infrastructure of data center 110 that provide computational resources to execute application workload. A compute node may, for example, be a bare-metal host of server 126, a virtual machine 148, a container or the like.

As shown in the example of FIG. 1, policy controller 201 may define and maintain a rule base as a set of policies 202. Policy controller 201 may administer control of each of servers 126 based on the set of policies 202 policy controller 201. Policies 202 may be created or derived in response to input by administrator 128 or in response to operations performed by policy controller 201. Policy controller 201 may, for example, observe operation of data center 110 over time and apply machine learning techniques to generate one or more policies 202. Policy controller 201 may periodically, occasionally, or continually refine policies 202 as further observations about data center 110 are made.

Policy controller 201 (e.g., an analytics engine within policy controller 201) may determine how policies are deployed, implemented, and/or triggered at one or more of servers 126. For instance, policy controller 201 may be configured to push one or more policies 202 to one or more of the policy agents 205, 206 executing on servers 126. Policy controller 201 may receive data from one or more of policy agents 205, 206 and determine if conditions of a rule for the one or more metrics are met. Policy controller 201 may analyze the data received from policy agents 205, 206, and based on the analysis, instruct, or cause one or more policy agents 205, 206 to perform one or more actions to modify the operation of the server or network device associated with a policy agent.

In some examples, policy controller 201 may be configured to generate rules associated with resource utilization of infrastructure elements, such as resource utilization of network devices 152 and control plane servers 160. As used herein, a resource generally refers to a consumable component of the virtualization infrastructure, i.e., a component that is used by the infrastructure, such as CPUs, memory, disk, disk I/O, network I/O, virtual CPUs, and virtual routers. A resource may have one or more characteristics each associated with a metric that is analyzed by the policy agent 205, 206 (and/or policy controller 201) and optionally reported. Lists of example raw metrics for resources are described below with respect to FIG. 3.

In general, an infrastructure element, also referred to herein as an element, is a component of the infrastructure that includes or consumes consumable resources in order to operate. Example elements includes hosts, physical or virtual network devices, instances (e.g., virtual machines, containers, or other virtual operating environment instances), and services. In some cases, an entity may be a resource for another entity. Virtual network devices may include, e.g., virtual routers and switches, vRouters, vSwitches, Open Virtual Switches, and Virtual Tunnel Forwarders (VTFs). A metric is a value that measures the amount of a resource, for a characteristic of the resource, that is consumed by an element.

Policy controller 201 may be implemented as or within any suitable computing device, or across multiple computing devices. Policy controller 201, or components of policy controller 201, may be implemented as one or more modules of a computing device. In some examples, policy controller 201 may include a number of modules executing on a class of compute nodes (e.g., "infrastructure nodes") included within data center 110. Such nodes may be OpenStack infrastructure service nodes or Kubernetes master nodes, and/or may be implemented as virtual machines. In some examples, policy controller 201 may have network connectivity to some or all other compute nodes within data center 110, and may also have network connectivity to other infrastructure services that manage data center 110.

One or more policies 202 may include instructions to cause one or more policy agents 205, 206 to monitor one or more metrics associated with servers 126 or network devices 152. One or more policies 202 may include instructions to cause one or more policy agents 205, 206 to analyze one or more metrics associated with servers 126 or network devices 152 to determine whether the conditions of a rule are met. One or more policies 202 may alternatively, or in addition, include instructions to cause policy agents 205, 206 to report one or more metrics to policy controller 201, including whether those metrics satisfy the conditions of a rule associated with one or more policies 202. The reported data may include raw data, summary data, and sampling data as specified or required by one or more policies 202.

In accordance with techniques of this disclosure, policy agents 205 of control plane servers 160 are configured to detect one or more VMs 148 that are executing on control plane servers 160 and dynamically associate each respective VM 148 with a particular one of network devices 152. In some examples, agent 205 of control plane servers 160 may receive (e.g., from virtualization utility 66 of FIG. 2) data identifying a set of one or more VMs 148 executing at a respective control plane server 160. For example, agent 205 may receive data including a unique identifier corresponding to each VM 148 executing at the respective control plane server 160. Responsive to receiving the data identifying the set of VMs executing at the respective control plane server 160, policy agent 205 may automatically and dynamically determine a network device 152 associated with the respective VM of VMs 148. For example, policy agent 205 may receive (e.g., from virtualization utility 66 of FIG. 2) metadata corresponding to the VM of VMs 148, where the metadata may include a unique identifier corresponding to a particular network device 152 and resource metrics associated with the VM (e.g., indicating resources of control plane server 160 utilized by the particular VM).

Policy agents 205 may associate each respective VM of VMs 148 with data plane resources of network devices 152. In some examples, policy agents 205 may associate a particular VM with a subset of forwarding units or line cards. For example, agent 205 may receive metadata that includes a unique identifier corresponding to a particular data plane resource (e.g., a particular forwarding unit) and resource metrics associated with the VM indicating resources of control plane server 160 utilized by that VM.

Responsive to dynamically associating each VM 148 with a respective network device 152, policy agents 205 may monitor some or all of the performance metrics associated with servers 160 and/or virtual machines 148 executing on servers 160. Policy agents 205 may analyze monitored data and/or metrics and generate operational data and/or intelligence associated with an operational state of servers 160 and/or one or more virtual machines 148 executing on such servers 160. Policy agents 205 may interact with a kernel operating one or more servers 160 to determine, extract, or receive control plane usage metrics associated with use of shared resources by one or more processes and/or virtual machines 148 executing at servers 160. Similarly, policy agents 206 may monitor telemetry data, also referred to as data plane usage metrics, received from one or more network devices 152. Policy agents 205, 206 may perform monitoring and analysis locally at each of servers 160, 162. In some examples, policy agents 205, 206 may perform monitoring and/or analysis in a near and/or seemingly real-time manner.

In the example of FIG. 1, and in accordance with one or more aspects of the present disclosure, policy agents 205, 206 may monitor servers 160 and network devices 152. For example, policy agent 205 of server 160 may interact with components, modules, or other elements of server 160 and/or one or more virtual machines 148 executing on servers 126. Similarly, policy agents 206 of data plane proxy servers 162 may monitor data plane usage metrics received from one or more network devices 152. Policy agents 205, 206 may collect data about one or more metrics associated with servers 160, virtual machines 148, or network devices 152. Such metrics may be raw metrics, which may be based directly or read directly from servers 160, virtual machines 148, network devices 152, and/or other components of data center 110. In other examples, one or more of such metrics may be calculated metrics, which include those derived from raw metrics. In some examples, metrics may correspond to a percentage of total capacity relating to a particular resource, such as a percentage of CPU utilization, or CPU consumption, or Level 3 cache usage. However, metrics may correspond to other types of measures, such as how frequent one or more virtual machines 148 are reading and writing to memory.

Policy controller 201 may configure policy agents 205, 206 to monitor for conditions that trigger an alarm. For example, policy controller 201 may detect input from user interface device 129 that policy controller 201 determines corresponds to user input. Policy controller 201 may further determine that the user input corresponds to data sufficient to configure a user-specified alarm that is based on values for one or more metrics. Policy controller 201 may process the input and generate one or more policies 202 that implements the alarm settings. In some examples, such policies 202 may be configured so that the alarm is triggered when values of one or more metrics collected by policy agents 205, 206 exceed a certain threshold. Policy controller 201 may communicate data about the generated policies 202 to one or more policy agents 205, 206. In some examples, policy agents 205 monitor servers 160 and policy agents 206 monitor data plane usage metrics received from network devices 152 to detect conditions on which the alarm is based, as specified by the policies 202 received from policy controller 201.

Policy agents 205 may monitor one or more control plane usage metrics at control plane servers 160. Such metrics may involve server 160, all virtual machines 148 executing on server 160, and/or specific instances of virtual machines 148. Policy agent 205 may poll resources of servers 160 to determine resource metrics, such as CPU usage, RAM usage, disk usage, etc. associated with a specific VM 148. In some examples, policy agents 205 poll servers 160 periodically, such as once every second, once every three seconds, once every minute, etc. Policy agents 205 may determine, based on the monitored metrics, that one or more values exceed a threshold set by or more policies 202 received from policy controller 201. For instance, policy agent 205 may determine whether CPU usage exceeds a threshold set by a policy (e.g., server 160 CPU usage >50%). In other examples policy agent 205 may evaluate whether one or more metrics is less than a threshold value (e.g., if server 160 available disk space <20%, then raise an alarm), or is equal to a threshold value (e.g., if the number of instances of virtual machines 148 equals 20, then raise an alarm).

If policy agent 205 determines that the monitored metric triggers the threshold value, policy agent 205 may raise an alarm condition and communicate data about the alarm to policy controller 201. Policy controller 201 and/or policy agent 205 may act on the alarm, such as by generating a notification. Policy controller 201 may update dashboard 203 to include the notification. Policy controller 201 may cause updated dashboard 203 to be presented at user interface device 129, thereby notifying administrator 128 of the alarm condition.

Policy agent 206 may monitor one or more data plane usage metrics of network devices 152. Data plane proxy server 162 may receive data plane usage metrics from network devices 152. For example, network devices 152 may periodically "push" data plane usage metrics to data plane proxy server 162 (e.g., once every two seconds, once every 30 seconds, once every minute, and so on). Data plane proxy server 162 may receive data plane usage metrics according to various protocols, such as SNMP, remote procedural call (e.g., gRPC), or a Telemetry Interface. Examples of data plane usage metrics include physical interface statistics, firewall filter counter statistics, or statistics for label-switched paths (LSPs). Policy agent 206 may determine, based on the monitored metrics, that one or more values exceed a threshold set by or more policies 202 received from policy controller 201. For instance, policy agent 206 may determine whether a quantity of dropped packets exceeds a threshold set by a policy. In other examples policy agent 206 may evaluate whether one or more metrics is less than a respective threshold value, or is equal to a respective threshold value. If policy agent 206 determines that the monitored metric triggers the respective threshold value, policy agent 206 may raise an alarm condition and communicate data about the alarm to policy controller 201. Policy controller 201 and/or policy agent 206 may act on the alarm, such as by generating a notification. Policy controller 201 may update dashboard 203 to include the notification. Policy controller 201 may cause updated dashboard 203 to be presented at user interface device 129, thereby notifying administrator 128 of the alarm condition.

Policy controller 201 may generate composite policies (also referred to as composite rules, combined policies, or combined rules) to trigger an alarm based on resource usage of control plane servers 160 and telemetry data from associated network devices 152. For example, policy controller 201 may generate an alarm in response to receiving data from a policy agent 205 of a respective control plane server 160 indicating that CPU usage corresponding to a particular VM 148 satisfies a threshold usage (e.g., >50%) and receiving data from policy agent 206 of data plane proxy server 162 indicating that the quantity of packets dropped by linecards of one of network devices 152 satisfies a threshold quantity of dropped packets. As another example, policy controller 201 may generate an alarm in response to receiving data from a policy agent 205 indicating that baseline memory usage of a particular VM 148 satisfies a threshold usage (e.g., >50%) and receiving data from policy agent 206 indicating that the quantity of OSPF routes satisfies a threshold quantity of routes.

In some examples, policy controller 201 may generate policies and establish alarm conditions without user input. For example, policy controller 201 may apply analytics and machine learning to metrics collected by policy agents 205, 206. Policy controller 201 may analyze the metrics collected by policy agents 205, 206 over various time periods. Policy controller 201 may determine, based on such analysis, data sufficient to configure an alarm for one or more metrics. Policy controller 201 may process the data and generate one or more policies 202 that implements the alarm settings. Policy controller 201 may communicate data about the policy to one or more policy agents 205, 206. Each of policy agents 205, 206 may thereafter monitor conditions and respond to conditions that trigger an alarm pursuant to the corresponding policies 202 generated without user input.

In accordance with techniques of this disclosure, agents 205 and 206 may monitor usage of resources of control plane servers 160 and data plane proxy servers 162, respectively, and may enable policy control 201 to analyze and control individual virtual nodes of network devices 152. Policy controller 201 obtains the usage metrics from policy agents 205, 206 and constructs a dashboard 203 (e.g., a set of user interfaces) to provide visibility into operational performance and infrastructure resources of data center 110. Policy controller 201 may, for example, communicate dashboard 203 to UI device 129 for display to administrator 128. In addition, policy controller 201 may apply analytics and machine learning to the collected metrics to provide real-time and historic monitoring, performance visibility and dynamic optimization to improve orchestration, security, accounting and planning within data center 110.

Dashboard 203 may represent a collection of user interfaces presenting data about metrics, alarms, notifications, reports, and other data about data center 110. Dashboard 203 may include one or more user interfaces that are presented by user interface device 129. User interface device 129 may detect interactions with dashboard 203 as user input (e.g., from administrator 128). Dashboard 203 may, in response to user input, cause configurations to be made to aspects of data center 110 or projects executing on one or more virtual machines 148 of data center 110 relating to network resources, data transfer limitations, and/or storage limitations.

Dashboard 203 may include a graphical view that provides a quick, visual overview of resource utilization by instance. For example, dashboard 203 may output a graphical user interface, such as graphical user interface 501, 601, or 701, of FIGS. 5, 6, and 7, respectively. The graphical user interface may include data corresponding to one or more of network devices 152 or one or more virtual nodes of a network device. For example, dashboard 203 may output a graphical user interface that includes graphs or other data indicating resource utilization for a control plane of a network device 152, such as data indicative of the control plane usage metrics (e.g., a number of VMs executing the control plane, processor usage, memory usage, etc.). Similarly, dashboard 203 may output a graphical user interface that includes graphs or other data indicating the status of the data plane of the network device 152, such as data indicative of the data plane usage metrics. Data plane usage metrics may include statistics per node per port for packets, bytes, or queues. Data plane usage metrics may include system level metrics for linecards. As another example, dashboard 203 may output a graphical user interface that includes data indicating control plane usage metrics and data plane usage metrics for a virtual node in a single graphical user interface. In some examples, dashboard 203 may highlight resource utilization by instances on a particular project or host, or total resource utilization across all hosts or projects, so that administrator 128 may understand the resource utilization in context of the entire infrastructure.

Further, dashboard 203 may output an alarm in response to receiving data from agents 205, 206 indicating that one or more metrics satisfy a threshold. For example, dashboard 203 may generate a graphical user interface that includes a graphical element (e.g., icon, symbol, text, image, etc.), the graphical element indicating an alarm for a particular network device 152 or a particular virtual node associated with network device 152. In this way, dashboard 203 presents data in a way that allows administrator 128, if dashboard 203 is presented at user interface device 129, to quickly identify data that indicates under-provisioned or over-provisioned instances.

By dynamically determining a set of VMs executing the control planes of respective network devices 152 and determining a particular network device 152 corresponding to the control plane, policy controller 201 may monitor resources and performance of the control plane and associated data plane. By monitoring the resources and performance of the control plane and data plane of a virtual node, policy controller 201 may aggregate data for the control plane and data plane of a virtual node and generate enhanced graphical user interfaces for monitoring a virtual node. The enhanced graphical user interfaces may enable an administrator 128 to quickly and easily identify potential issues in data center 110. In this way, policy controller 201 of data center 110 may take steps to address how such processes operate or use shared resources, and as a result, improve the aggregate performance of virtual machines, containers, and/or processes executing on any given server, and/or improve the operation network devices 152 (e.g., by improving operation of control plane servers 160). Accordingly, as a result of identifying processes adversely affecting the operation of other processes and taking appropriate responsive actions, virtual machines 148 may perform computing operations on servers 160 more efficiently, more efficiently use shared resources of servers 160, and improve operation of network devices 152. By performing computing operations more efficiently and improving performance and efficiency of network devices 152, data center 110 may perform computing tasks more quickly and with less latency. Therefore, aspects of this disclosure may improve the function of servers 160, network devices 152, and data center 110.

Further, assessment of metrics or conditions that may trigger an alarm may be implemented locally at each of servers 126 (e.g., by policy agents 205, 206). By performing such assessments locally, performance metrics associated with the assessment can be accessed at a higher frequency, which can permit or otherwise facilitate performing the assessment faster. Implementing the assessment locally may, in some cases, avoid the transmission of data indicative of performance metrics associated with assessment to another computing device (e.g., policy controller 201) for analysis. As such, latency related to the transmission of such data can be mitigated or avoided entirely, which can result in substantial performance improvement in scenarios in which the number of performance metrics included in the assessment increases. In another example, the amount of data that is sent from the computing device can be significantly reduced when data indicative or otherwise representative of alarms and/or occurrence of an event is to be sent, as opposed to raw data obtained during the assessment of operational conditions. In yet another example, the time it takes to generate the alarm can be reduced in view of efficiency gains related to latency mitigation.

Various components, functional units, and/or modules illustrated in FIG. 1 (e.g., user interface device 129, orchestration engine 130, SDN controller 132, and policy controller 201, policy agents 205, 206) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform.

In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as part of an operating system executed on a computing device.

Figure 2:
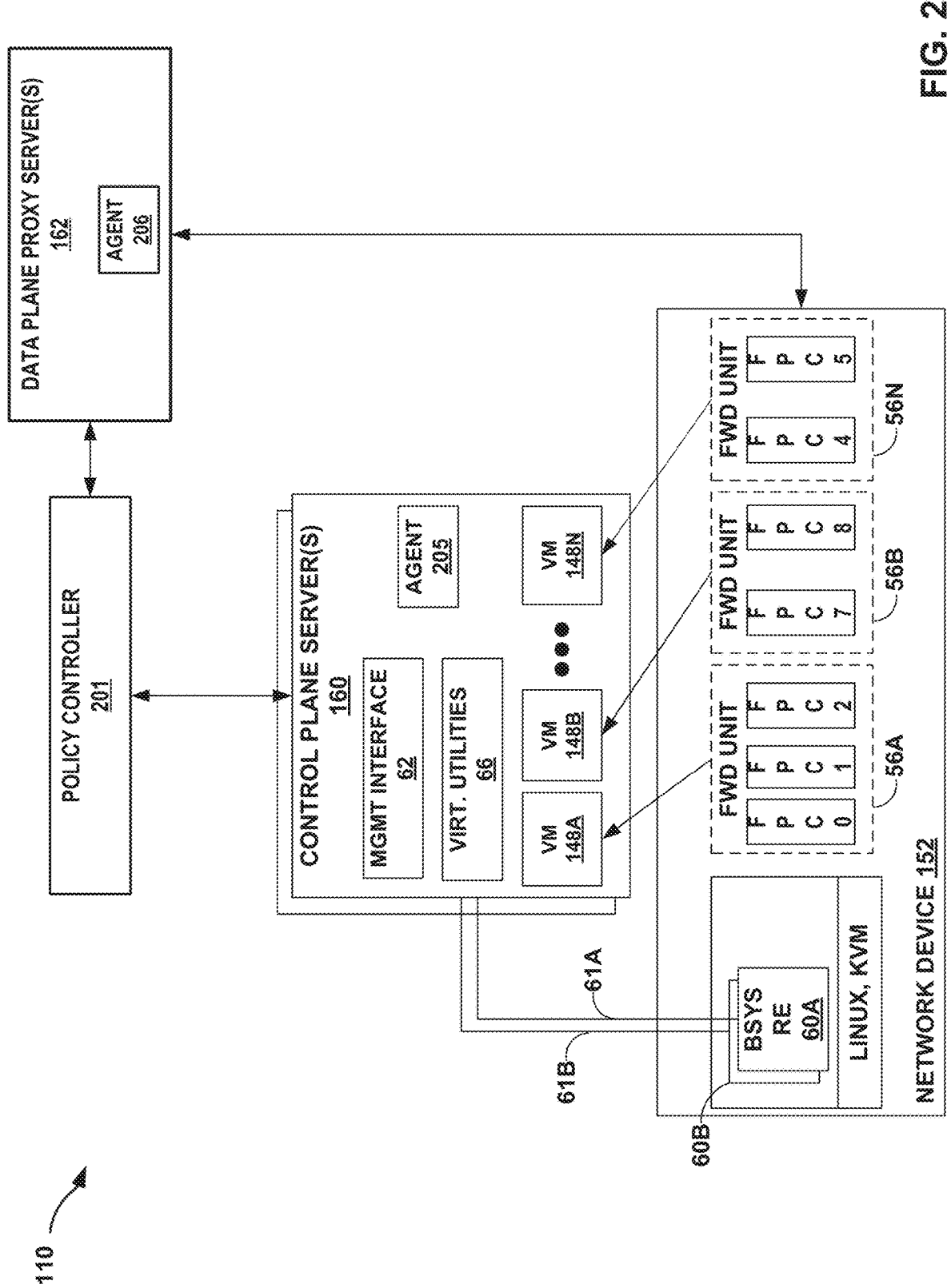
FIG. 2 is a block diagram illustrating a portion of the example data center of FIG. 1 in further detail, in accordance with one or more aspects of the present disclosure.

FIG. 2 is a block diagram illustrating a portion of the example data center of FIG. 1 in further detail. Network device 152 may represent a single-chassis router. Control plane servers 160 may include a plurality of virtual machines 148A-148N (collectively, "virtual machines 148") configured to provide control plane functionality for network device 152. In some examples, each control plane server of control plane servers 160 represent a master and backup pair. Data plane proxy servers 162 monitor usage metrics for the data plane of network device 152.

Network device 152 includes BSYS (Base SYStem) routing engines (RE) 60A, 60B (collectively, B SYS REs 60), which are controllers that run natively on network device 152. In some examples, each BSYS RE 60 may run as a bare-metal component. BYS REs 60 may operate as a master/backup pair on network device 152. Links 61A, 61B ("links 61") connect the VMs 148 of control plane servers 160 to BSYS RE 60. In some examples, links 61 may be Ethernet links. Although shown in FIG. 2 as having two links 61, in fact there may be a separate link between each BSYS RE instance on network device 152 and each of control plane servers 160.

Network device 152 includes a plurality of forwarding units or line cards 56A-56N ("forwarding units 56"). In the example of FIG. 2, each forwarding unit 56 is shown as including one or more flexible programmable integrated circuit (PIC) concentrators (FPCs) that provide a data plane for processing network traffic. Forwarding unit 56 receive and send data packets via interfaces of interface cards (IFCs, not shown) each associated with a respective one of forwarding units 56. Each of forwarding units 56 and its associated IFC(s) may represent a separate line card insertable within network device 152. Example line cards include flexible programmable integrated circuit (PIC) concentrators (FPCs), dense port concentrators (DPCs), and modular port concentrators (MPCs). Each of the IFCs may include interfaces for various combinations of layer two (L2) technologies, including Ethernet, Gigabit Ethernet (GigE), and Synchronous Optical Networking (SONET) interfaces, that provide an L2 interface for transporting network packets.

Each forwarding unit 56 includes at least one packet processor that processes packets by performing a series of operations on each packet over respective internal packet forwarding paths as the packets traverse the internal architecture of network device 152. Packet processor of each respective forwarding unit 56, for instance, includes one or more configurable hardware chips (e.g., a chipset) that, when configured by applications executing on control unit, define the operations to be performed by packets received by the respective forwarding unit 56. Each chipset may in some examples represent a "packet forwarding engine" (PFE). Each chipset may include different chips each having a specialized function, such as queuing, buffering, interfacing, and lookup/packet processing. Each of the chips may represent application specific integrated circuit (ASIC)-based, field programmable gate array (FPGA)-based, or other programmable hardware logic.

A single forwarding unit 56 may include one or more packet processors. Packet processors process packets to identify packet properties and perform actions bound to the properties. Each of the packet processors includes forwarding path elements that, when executed, cause the packet processor to examine the contents of each packet (or another packet property, e.g., incoming interface) and on that basis make forwarding decisions, apply filters, and/or perform accounting, management, traffic analysis, and load balancing, for example. In one example, each of the packet processors arranges forwarding path elements as next hop data that can be chained together as a series of "hops" in a forwarding topology along an internal packet forwarding path for the network device. The result of packet processing determines the manner in which a packet is forwarded or otherwise processed by the packet processors of forwarding unit 56 from its input interface to, at least in some cases, its output interface.

Each VM of VMs 148, in combination with the respective forwarding unit 56, serves as a separate virtual node or node slice. In the arrangement of FIG. 2, network device 152 is partitioned into three virtual nodes, a first virtual node associated with forwarding unit 56A and VM 148A, a second virtual associated with forwarding unit 56B and VM 148B, and a third virtual node associated with forwarding unit 56C and VM 148C . . . . The node slices are isolated, e.g., each node slice does not have access to data about the hardware details of the others. Further, even the FPCs are unaware of other FPCs in other forwarding units 56. For example, FPC0 of forwarding unit 56A has awareness of FPC1 and FPC2, but not of FPC7, FPC8, FPC4, or FPC5.

VMs 148 may each provide control plane functionality for network device 152 by executing a corresponding routing process that executes one or more interior and/or exterior routing protocols to exchange routing data with other network devices and store received routing data in a routing data base (not shown). For example, VMs 148 may execute protocols such as one or more of Border Gateway Protocol (BGP), including interior BGP (iBGP), exterior BGP (eBGP), multiprotocol BGP (MP-BGP), Label Distribution Protocol (LDP), and Resource Reservation Protocol with Traffic-Engineering Extensions (RSVP-TE). The routing data base may include data defining a topology of a network, including one or more routing tables and/or link-state databases. Each of VMs 148 resolves the topology defined by the routing data base to select or determine one or more active routes through the network and then installs these routes to forwarding data bases of forwarding units 56.

Management interface 62 provides a shell by which an administrator or other management entity may modify the configuration of respective virtual nodes of network device 152 using text-based commands. Using management interface 62, for example, management entities may enable/disable and configure services, manage classifications and class of service for packet flows, install routes, enable/disable and configure rate limiters, configure traffic bearers for mobile networks, and configure abstract fabric interfaces between nodes, for example.

Virtualization utilities 66 may include an API, daemon and management tool (e.g., libvirt) for managing platform virtualization. Virtualization utilities 66 may be used in an orchestration layer of a hypervisor of control plane servers 160.

In a node slicing deployment, high availability is provided by master and backup VMs 148, which exchange periodic keepalive messages (or "hello" messages) via links 61 and BSYS RE 60. The keepalive may be sent according to an internal control protocol (ICP) for communication between components of network device 152. BSYS RE 60 may store state in one or more data structures that indicates whether the keepalive messages were received as expected from each of VMs 148.

The techniques of this disclosure provide a mechanism to dynamically associate each respective VM 148 with a particular network device 152 and/or set of forwarding units 56 within network device 152. In some examples, agent 205 of control plane servers 160 utilizes virtualization utilities 66 to determine a set of VMs 148 that provide control plane functionality for one or more forwarding units 56 of a data plane of network device 152. Agent 205 may determine the set of VMs 148 that provide control plane functionality by identifying each VM 148 executing at each one of control plane servers 160. For example, a particular agent 205 may call virtualization utilities 66 which may execute a function to identify each VM executing at the corresponding one of control plane servers 160. In some examples, agent 205 may call or invoke virtualization utilities 66 via a script (e.g., "acelio@ace44:~$ virsh list—all") and may receive data identifying the set of VMs 148, an example of which is shown in Table 1 below.

TABLE 1

| Id | Name | State |
|---|---|---|
| 3 | instance-0000000e (VM 148A) | running |
| 4 | instance-00000007 (VM 148B) | running |
| 549 | instance-000000eb (VM 148C) | running |
| 554 | instance-00000042 (VM 148D) | running |
| 590 | instance-000000fe (VM 148E) | running |
| ... | | |
| — | instance-00000041 (VM 148N) | stopped |

As illustrated in Table 1 above, in response to calling virtualization utilities 66, agent 205 may receive data indicating a unique identifier (e.g., "Id") corresponding to one of VMs executing at one of control plane servers 160, a name or textual identifier of the corresponding instance of VM 148 (e.g., "Name"), and a status of each corresponding instance of VM 148 (e.g., "State"). Agent 205 may determine the set of VMs 148 that provide the control plane functionality for network device 152 based on the data received. In some examples, the values of the "State" field may include "undefined", "defined" or "stopped", "running", "paused", or "saved", as a non-exhaustive list. In some instances, an "undefined" state may mean the domain hasn't been defined or created yet. A "defined" or "stopped" state may mean the domain has been defined, but it's not running. In some examples, persistent domains can be in the "defined" or "stopped" state. A "running state" may mean, in some examples, that the domain has been created and started either as transient or persistent domain, and is being actively executed on the node's hypervisor. In some examples, a "paused" state means the domain execution on hypervisor has been suspended and that the state has been temporarily stored until it is resumed. As another example, the "saved" state may mean the domain execution on hypervisor has been suspended and that the state has been stored to persistent storage until it is resumed. Agent 205 may determine that each VM 148 with a status or state of "running" provides control plane functionality for network device 152 and that each VM 148 with a status or state of "stopped" is not providing control plane functionality for network device 152.

Agent 205 may determine that a particular VM of VMs 148 may provide control plane functionality for all of the forwarding units 56 of a particular network device 152. As another example, agent 205 may determine that the particular VM 148 provides control plane functionality for a subset (e.g., less than all) of the forwarding units 56. In some examples, agent 205 determines whether a particular VM (e.g., VM 148A) provides control plane functionality for all or a subset of forwarding unit 56 based on additional data received from virtualization utilities 66. For example, agent 205 may call or invoke virtualization utilities 66 via a script (e.g., "acelio@ace44:~$ virsh dumpxml 3") that identifies VM 148A as the VM for which additional data is requested (e.g., the script above requests metadata for VM 148A identified by a unique identifier=3). Responsive to calling virtualization utilities 66, agent 205 may receive data identifying a network device 152 and/or forwarding units 56 for which VM 148A provides control plane functionality, such as the data shown below in Table 2.

TABLE 2

```
<domain type='kvm' id='3'>
  <name>instance-0000000e</name>
  <uuid>e9655260-3316-4c57-917e-d0708e2069fa</uuid>
  <mx2020_metadata>
    <deviceid>"cc36c55256d54341970f1c956a65ccbf"</deviceid>
  </mx2020_metadata>
</domain type='kvm' id='3'>
```

As illustrated in Table 2, agent 205 may receive data uniquely identifying a network device of network devices 152. For example, the value for the field "deviceid" may uniquely identify a particular network device 152. In some examples, agent 205 may receive data uniquely identifying one or more forwarding units 56. For example, the value for the field "deviceid" may uniquely identify a subset of the set of forwarding units 56 of network device 152 for which VM 148A provides control plane functionality.

Agent 205 outputs data associating VM 148A with the particular network device 152 and/or forwarding units 56 to policy controller 201. In some examples, agent 205 may output data including the unique identifier corresponding to VM 148A and a unique identifier corresponding to network device 152 or a subset of forwarding units 56. For example, the data may include a mapping table or other data structure indicating the unique identifier for VM 148A corresponds to the unique identifier for network device 152 or subset of forwarding units 56. Policy controller 201 may receive the data associating VM 148A with the particular network device 152 and/or forwarding units and may store the data in a data structure (e.g., an array, a list, a hash, a graph, etc.).

In some examples, policy controller 201 tags each VM 148 with a respective network device 152. Policy controller 201 may "tag" each VM by storing a data structure associating each VM 148 with a respective network device 152. For example, as further illustrated in FIG. 5, policy controller 201 may generate a tag "MX-1", agent 205 may determine that two VMs 148 (e.g., labeled "Mongo-1" and "Mongo-2") provide control plane functionality for a particular network device 152, such that agent 205 may output (e.g., to policy controller 201) data associating the VMs 148 with the network device 152 and policy controller 201 may "tag" VMs 148 with a label corresponding to the network device for which the VMs 148 provide control plane functionality, e.g., "MX-1". In other words, policy controller 201 may store a data structure (e.g., a mapping table) that indicates VMs 148 identified as "Mongo-1" and "Mongo-2", respectively, are associated with a network device 152 identified as "MX-1", which may enable policy controller 201 to output data (e.g., a GUI) that includes usage metrics for a plurality of VMs that provide control functionality for the same network device 152 via a single user interface. Additional information regarding tagging objects is found in U.S. patent application Ser. No. 15/819,522, filed Nov. 21, 2017, and entitled SCALABLE POLICY MANAGEMENT FOR VIRTUAL NETWORKS, which is incorporated by reference as if fully set forth herein.

Agent 205 determines control plane usage metrics for resources of one or more of VMs 148. In some examples, agent 205 may poll the corresponding control plane server 160 to receive usage metrics for VM 148A. For example, agent 205 may poll the control plane server 160 by calling or invoking virtualization utilities 66 via a script, which may be the same script as the script used to identify the network device 152 and/or forwarding planes associated with VM 148A. Responsive to polling control plane server 160, agent 205 may receive usage metrics for resources consumed by VM 148A. For example, agent 205 may receive data that includes the control plane usage metrics, as shown below in Table 3.

TABLE 3

```
<domain type='kvm' id='3'>
 <name>instance-0000000e</name>
 <uuid>e9655260-3316-4c57-917e-d0708e2069fa</uuid>
 <mx2020_metadata>
  <deviceid>"cc36c55256d54341970f1c956a65ccbf"</deviceid>
 </mx2020_metadata>
 <metadata>
  <nova:instance xmlns:nova="http://openstack.org/
xmlns/libvirt/nova/1.0">
   <nova:package version="12.0.5"/>
   <nova:name>ceph-node-2</nova:name>
   <nova:creationTime>2017-07-10 20:28:08</nova:creationTime>
   <nova:flavor name="m1.small">
    <nova:memory>2048</nova:memory>
    <nova:disk>20</nova:disk>
    <nova:swap>0</nova:swap>
    <nova:ephemeral>0</nova:ephemeral>
    <nova:vcpus>1</nova:vcpus>
   </nova:flavor>
   <nova:owner>
    <nova:user uuid="cc36c55256d54341970f1c956a65ccbf">
admin</nova:user>
    <nova:project uid="4f8b73c26ea2473589ec46d205d10925">
admin</nova:project>
   </nova:owner>
   <nova:root type="image" uuid="de030add-5593-4604-b1aa-631
cfbd58502"/>
  </nova:instance>
 </metadata>
 <memory unit='KiB'>2097152</memory>
 <currentMemory unit='KiB'>2097152</currentMemory>
 <vcpu placement='static'>1</vcpu>
 <cputune>
  <shares>1024</shares>
 </cputune>
 <resource>
  <partition>/machine</partition>
 </resource>
 <sysinfo type='smbios'>
  <system>
   <entry name='manufacturer'>OpenStack Foundation</entry>
   <entry name='product'>OpenStack Nova</entry>
   <entry name='version'>12.0.5</entry>
   <entry name='serial'>54443858-4e54-2500-9048-00259048a9aa</entry>
   <entry name='uuid'>e9655260-3316-4c57-917e-d0708e2069fa</entry>
   <entry name='family'>Virtual Machine</entry>
  </system>
 </sysinfo>
 <os>
  <type arch='x86_64' machine='pc-i440fx-vivid'>hvm</type>
  <boot dev='hd'/>
  <smbios mode='sysinfo'/>
 </os>
 <features>
  <acpi/>
  <apic/>
 </features>
 <cpu mode='host-model'>
  <model fallback='allow'/>
  <topology sockets='1' cores='1' threads='1'/>
 </cpu>
 <clock offset='utc'>
  <timer name='pit' tickpolicy='delay'/>
  <timer name='rtc' tickpolicy='catchup'/>
  <timer name='hpet' present='no'/>
 </clock>
 <on_poweroff>destroy</on_poweroff>
 <on_reboot>restart</on_reboot>
 <on_crash>destroy</on_crash>
 <devices>
  <emulator>/usr/bin/qemu-system-x86_64</emulator>
  <disk type='file' device='disk'>
   <driver name='qemu' type='qcow2' cache='none'/>
   <source file='/var/lib/nova/instances/e9655260-3316-4c57-917e-
d0708e2069fa/disk'/>
```

TABLE 3-continued

```
   <backingStore type='file' index='1'>
    <format type='raw'/>
    <source
file='/var/lib/nova/instances/_base/
92681c9a223d48e0a36da1cdc24a084aac0f6ecd'/>
    <backingStore/>
   </backingStore>
   <target dev='vda' bus='virtio'/>
   <alias name='virtio-disk0'/>
   <address type='pci' domain='0x0000' bus='0x00' slot=
'0x04' function='0x0'/>
  </disk>
  <disk type='block' device='disk'>
   <driver name='qemu' type='raw' cache='none'/>
   <source dev='/dev/disk/by-path/ip-10.87.68.29:3260-iscsi-iqn.2010
10.org.openstack:volume-0274dcd8-2f40-4774-af22-
fa5f864a88e4-lun-1'/>
   <backingStore/>
   <target dev='vdb' bus='virtio'/>
   <serial>0274dcd8-2f40-4774-af22-fa5f864a88e4</serial>
   <alias name='virtio-disk1'/>
   <address type='pci' domain='0x0000' bus='0x00' slot=
'0x05' function='0x0'/>
  </disk>
  <disk type='file' device='disk'>
   <driver name='qemu' type='raw'/>
   <source file='/var/lib/libvirt/images/instance-0000000e.img'/>
   <backingStore/>
   <target dev='vdc' bus='virtio'/>
   <alias name='virtio-disk2'/>
   <address type='pci' domain='0x0000' bus='0x00' slot=
'0x07' function='0x0'/>
  </disk>
  <controller type='usb' index='0'>
   <alias name='usb'/>
   <address type='pci' domain='0x0000' bus='0x00' slot=
'0x01' function='0x2'/>
  </controller>
  <controller type='pci' index='0' model='pci-root'>
   <alias name='pci.0'/>
  </controller>
  <interface type='bridge'>
   <mac address='fa:16:3e:1e:58:9b'/>
   <source bridge='brq4b48847b-16'/>
   <target dev='tap9d17902d-ac'/>
   <model type='virtio'/>
   <alias name='net0'/>
   <address type='pci' domain='0x0000' bus='0x00' slot=
'0x03' function='0x0'/>
  </interface>
  <serial type='file'>
   <source path='/var/lib/nova/instances/e9655260-
3316-4c57-917e-d0708e2069fa/console.log'/>
   <target port='0'/>
   <alias name='serial0'/>
  </serial>
  <serial type='pty'>
   <source path='/dev/pts/4'/>
   <target port='1'/>
   <alias name='serial1'/>
  </serial>
  <console type='file'>
   <source path='/var/lib/nova/instances/e9655260-
3316-4c57-917e-d0708e2069fa/console.log'/>
   <target type='serial' port='0'/>
   <alias name='serial0'/>
  </console>
  <input type='tablet' bus='usb'>
   <alias name='input0'/>
  </input>
  <input type='mouse' bus='ps2'/>
  <input type='keyboard' bus='ps2'/>
  <graphics type='vnc' port='5901' autoport='yes' listen=
'0.0.0.0' keymap='en-us'>
   <listen type='address' address='0.0.0.0'/>
  </graphics>
  <video>
   <model type='cirrus' vram='16384' heads='1'/>
   <alias name='video0'/>
   <address type='pci' domain='x0000' bus='0x00'
```

TABLE 3-continued

```
   slot='0x02' function ='0x0'/>
  </video>
  <memballoon model='virtio'>
    <stats period='10'/>
    <alias name='balloon0'/>
    <address type='pci' domain='0x0000' bus='0x00'
slot='0x06' function='0x0'/>
  </memballoon>
 </devices>
 <seclabel type='dynamic' model='apparmor' relabel='yes'>
   <label>libvirt-e9655260-3316-4c57-917e-d0708e2069fa</label>
   <imagelabel>libvirt-e9655260-3316-4c57-917e-d0708e2069fa
   </imagelabel>
  </seclabel>
</domain>
```

As illustrated in Table 3, the control plane usage metrics may include data indicating an amount of memory utilized by VM 148A (e.g., "<currentMemory unit='KiB'>"), processor usage (e.g., "<cputune>"), among others.

Agent 205 outputs data associated with the control plane usage metrics to policy controller 201. For example, agent 205 may output at least a portion (e.g., all or a subset) of the raw control plane usage metrics. In such examples, policy controller 201 may receive the control plane usage metrics and may analyze the control plane usage metrics to determine whether the usage of a particular resource by VM 148A satisfies a threshold. As further described in FIG. 3, in another example, agent 205 may analyze the control plane usage metrics and output data indicating whether the control plane usage metrics for VM 148A satisfy the respective threshold for each respective usage metric.

Agent 205 may determine a plurality of VMs 148 that provide control plane functionality for one of network devices 152. In some examples, agent 205 determines that VM 148B provides control plane functionality in a manner similar to determining that VM 148A provides control plane functionality, as described above. Agent 205 may determine one of network devices 152 and/or one or more forwarding planes 56 for which VM 148B provides control plane functionality in the manner described above. In some scenarios, agent 205 determines control plane usage metrics for resources of control plane server 160 utilized by VM 148B and outputs data associated with the control plane usage metrics to policy controller 201. In some examples, the data associated with the control plane usage metrics includes at least a portion of the control plane usage metrics to policy controller 201. As another example, the data associated with the control plane usage metrics for VM 148B includes data indicating whether the control plane usage metrics for VM 148B satisfy a respective threshold.

Agent 205 may determine a plurality of VMs 148 that provide control plane functionality for a different network device of network devices 152. In some examples, agent 205 determines that VM 148C provides control plane functionality for the different network device of network devices 152 in a manner similar to determining that VMs 148A, 148B provides control plane functionality, as described above. Agent 205 may determine a network device 152 and/or one or more forwarding planes 56 for which VM 148C provides control plane functionality in the manner described above. In some scenarios, agent 205 determines control plane usage metrics for resources of control plane server 160 utilized by VM 148C and outputs data associated with the control plane usage metrics to policy controller 201. In some examples, the data associated with the control plane usage metrics includes at least a portion of the control plane usage metrics to policy controller 201. As another example, the data associated with the control plane usage metrics for VM 148C includes data indicating whether the control plane usage metrics for VM 148C satisfy a respective threshold.

One or more data plane proxy servers 162 each include a respective policy agent 206. Policy agent 206 may monitor data plane usage metrics for one or more network devices 152. For example, policy agent may periodically receive (e.g., once every 2 seconds, every 30 seconds, every minute, etc.) data plane usage metrics from network devices 152. Policy agent 206 may analyze the data plane usage metrics locally. Examples of data plane usage metrics include physical interface statistics, firewall filter counter statistics, or statistics for label-switched paths (LSPs). Data plane usage metrics may include statistics per node per port for packets, bytes, or queues. Data plane usage metrics may include system level metrics for linecards.

Table 4 illustrates an example set of data plane usage metrics per interface that may be monitored via SNMP monitoring.

TABLE 4

| Metric | Unit |
| --- | --- |
| snmp.interface.out_discards | discards/s |
| snmp.interface.in_discards | discards/s |
| snmp.interface.in_errors | errors/s |
| snmp.interface.out_unicast_packets | packets/s |
| snmp.interface.in_octets | octets/s |
| snmp.interface.in_unicast_packets | packets/s |
| snmp.interface.out_packet_queue_length | count |
| snmp.interface.speed | bits/s |
| snmp.interface.out_octets | octets/s |
| snmp.interface.in_unknown_protocol | packets/s |
| snmp.interface.in_non_unicast_packets | packets/s |
| snmp.interface.out_errors | errors/s |
| snmp.interface.out_non_unicast_packets | packets/s |

Table 5 illustrates an example set of data plane usage metrics per interface that may be monitored via telemetry interface network device monitoring.

TABLE 5

| Metric | Unit |
| --- | --- |
| system.linecard.interface.egress_errors.if_errors | errors/s |
| system.linecard.interface.egress_errors.if_discard | discards/s |
| system.linecard.interface.egress_stats.if_1sec_pkts | packets/s |
| system.linecard.interface.egress_stats.if_octets | octets/s |
| system.linecard.interface.egress_stats.if_mc_pkts | packets/s |
| system.linecard.interface.egress_stats.if_bc_pkts | packets/s |
| system.linecard.interface.egress_stats.if_1sec_octets | octets/s |
| system.linecard.interface.egress_stats.if_pkts | packets/s |
| system.linecard.interface.egress_stats.if_uc_pkts | packets/s |
| system.linecard.interface.egress_stats.if_pause_pkts | packets/s |
| system.linecard.interface.ingress_errors.if_in_fifo_errors | errors/s |
| system.linecard.interface.ingress_errors.if_in_frame_errors | errors/s |
| system.linecard.interface.ingress_errors.if_in_l3_incompletes | packets/s |
| system.linecard.interface.ingress_errors.if_in_runts | packets/s |
| system.linecard.interface.ingress_errors.if_errors | errors/s |
| system.linecard.interface.ingress_errors.if_in_l2chan_errors | errors/s |
| system.linecard.interface.ingress_errors.if_in_resource_errors | errors/s |
| system.linecard.interface.ingress_errors.if_in_qdrops | drops/s |
| system.linecard.interface.ingress_errors.if_in_l2_mismatch_timeouts | packets/s |
| system.linecard.interface.ingress_stats.if_1sec_pkts | packets/s |
| system.linecard.interface.ingress_stats.if_octets | octets/s |
| system.linecard.interface.ingress_stats.if_mc_pkts | packets/s |
| system.linecard.interface.ingress_stats.if_bc_pkts | packets/s |
| system.linecard.interface.ingress_stats.if_1sec_octets | octets/s |

TABLE 5-continued

| Metric | Unit |
| --- | --- |
| system.linecard.interface.ingress_stats.if_error | errors/s |
| system.linecard.interface.ingress_stats.if_pkts | packets/s |
| system.linecard.interface.ingress_stats.if_uc_pkts | packets/s |
| system.linecard.interface.ingress_stats.if_pause_pkts | packets/s |

Table 6 illustrates an example set of data plane usage metrics per interface queue that may be monitored via telemetry interface network device monitoring.

TABLE 6

| Metric | Unit |
| --- | --- |
| system.linecard.interface.egress_queue_info.bytes | bytes/s |
| system.linecard.interface.egress_queue_info.packets | packets/s |
| system.linecard.interface.egress_queue_info.allocated_buffer_size | bytes |
| system.linecard.interface.egress_queue_info.avg_buffer_occupancy | bytes |
| system.linecard.interface.egress_queue_info.cur_buffer_occupancy | bytes |
| system.linecard.interface.egress_queue_info.peak_buffer_occupancy | bytes |
| system.linecard.interface.egress_queue_info.red_drop_bytes | bytes/s |
| system.linecard.interface.egress_queue_info.red_drop_packets | packets/s |
| system.linecard.interface.egress_queue_info.rl_drop_bytes | bytes/s |
| system.linecard.interface.egress_queue_info.rl_drop_packets | packets/s |
| system.linecard.interface.egress_queue_info.tail_drop_packets | packets/s |

In some examples, agent 206 receives data identifying the network device 152 and/or forwarding units 56 corresponding to the data plane usage metrics. For example, agent 206 may receive a packet of data that includes a unique identifier corresponding to a particular one of network devices 152 and/or a unique identifier corresponding to a subset of forwarding units 56, as well as the data plane usage metrics for the network device or subset of FPCs.

In some examples, agent 206 analyzes the data plane usage metrics to determine whether the data plane usage metrics satisfy a respective threshold. For example, agent 206 may receive data plane usage metrics indicating a quantity (e.g., number or percentage) of dropped packets and determine whether the quantity of dropped packets satisfies a threshold value. In response to determining that the data plane usage metrics satisfy a respective threshold, agent 206 may output (e.g., to policy controller 201) the data identifying the network device 152 or forwarding unit 56 and the data indicating that the data plane usage metrics satisfies the respective threshold. For example, agent 206 may output a notification that includes data indicating the number of quantity of dropped packets exceeds or is equal to a threshold quantity of dropped packets. In some examples, agent 206 outputs the data identifying the network device 152 or forwarding unit 56 and at least a portion of the data plane usage metrics to policy controller 201, such that policy agent 201 may determine whether the data plane usage metrics satisfy a respective threshold.

Policy controller 201 receives data from agents 205 and 206. For example, policy controller 201 may receive the data associating a particular VM (e.g., VM 148A) with a particular network device of network device 152 and the data associated with the control plane usage metrics (e.g., raw control plane usage metrics or data indicating a control plane usage metric satisfies a threshold) from policy agent 205 of control plane servers 160. Similarly, policy controller 201 may receive the data identifying a network device 152 or subset of forwarding units 56 and data associated with the data plane usage metrics (e.g., raw data plane usage metrics or data indicating a data plane usage metric satisfies the respective threshold).

Policy controller 201 may aggregate the data from agents 205 and agents 206 for display in a single graphical user interface (GUI). In some examples, policy controller 201 may determine that control plane usage metrics for VM 148A are associated with data plane usage metrics for network device 152. For example, policy controller 201 may receive, from agent 205, data identifying (e.g., the value of the field "deviceid") the network device 152 or forwarding units 56 that VM 148A (e.g., and its associated control plane usage metrics) correspond to. Similarly, policy controller 201 may receive, from agent 206, data identifying the network device 152 or forwarding units 56 that the data plane usage metrics correspond to.

Responsive to receiving the identifying data from policy agents 205 and 206, policy controller 201 may determine that the identifying data from agent 205 corresponds to (e.g., matches) the identifying data from agent 206, such that policy controller 201 may determine that the control plane usage metrics and data plane usage metrics correspond to the same network device 152 or forwarding unit 56. In other words, policy controller 201 may determine a particular virtual node with which the control plane usage metrics and data plane usage metrics are associated. In some examples, policy agent(s) 205, 206 determine this association, and provide the virtual node information to policy controller 201. Responsive to determining that the control plane usage metrics and data plane usage metrics correspond to the same network device 152, policy controller 201 may output, via a dashboard, the control plane usage metrics and data plane usage metrics in a single GUI for that network device 152. As another example policy controller 201 may output, via the dashboard, the usage metrics for virtual nodes (e.g., control plane usage metrics for VM 148A and associated data plane usage metrics for forwarding unit 56A).

As another example, policy controller 201 may determine that control plane usage metrics for VM 148A are associated with control plane usage metrics for VM 148B. In this way, policy controller 201 may aggregate control plane usage metrics for a plurality of VMs 148 that are each associated with the same network device 152 or forwarding units 56. For example, policy controller 201 may receive, from agent 205, data identifying (e.g., the value of the field "deviceid") the network device 152 or forwarding units 56 that VM 148A (e.g., and its associated control plane usage metrics) correspond to. Similarly, policy controller 201 may receive, from agent 205, data identifying (e.g., the value of the field "deviceid") the network device 152 or forwarding units 56 that VM 148B (e.g., and its associated control plane usage metrics) correspond to. Policy controller 201 may determine that the identifying data for VM 148A corresponds to (e.g., matches) the identifying data for VM 148B, such that policy controller 201 may determine that the control plane usage metrics for VM 148A and the control plane usage metrics for VM 148B correspond to the same network device 152 or forwarding unit 56. In such examples, responsive to determining that the control plane usage metrics correspond to the same network device 152 or forwarding unit 56, policy controller 201 may output, via a dashboard, the control plane usage metrics for VMs 148A and 148B in a single GUI for that network device 152 or forwarding unit 56.

Policy controller 201 may compare the data associated with the control plane usage metrics and the data associated with the data plane usage metrics to a composite policy to determine whether a virtual node (e.g., node slice) of a network device 152 is operating sufficiently. In other words, policy controller 201 may determine whether a virtual node is operating within predefined parameters based on the data associated with the control plane usage metrics and the data associated with the data plane usage metrics for that virtual node. For example, policy controller 201 may include a composite policy to generate an alarm in response to determining that the quantity of dropped packets for forwarding unit 56A satisfies a threshold quantity and that the CPU usage for VM 148A satisfies a threshold CPU usage. In some examples, policy controller 201 may compare control plane usage data and data plane usage data to the respective thresholds to determine whether to generate an alarm. As another example, policy controller 201 may generate an alarm in response to receiving data indicating that a control plane usage metric for a virtual node satisfies a respective threshold and receiving data indicating that a data plane usage metric for a virtual node satisfies a respective threshold.

Figure 3:
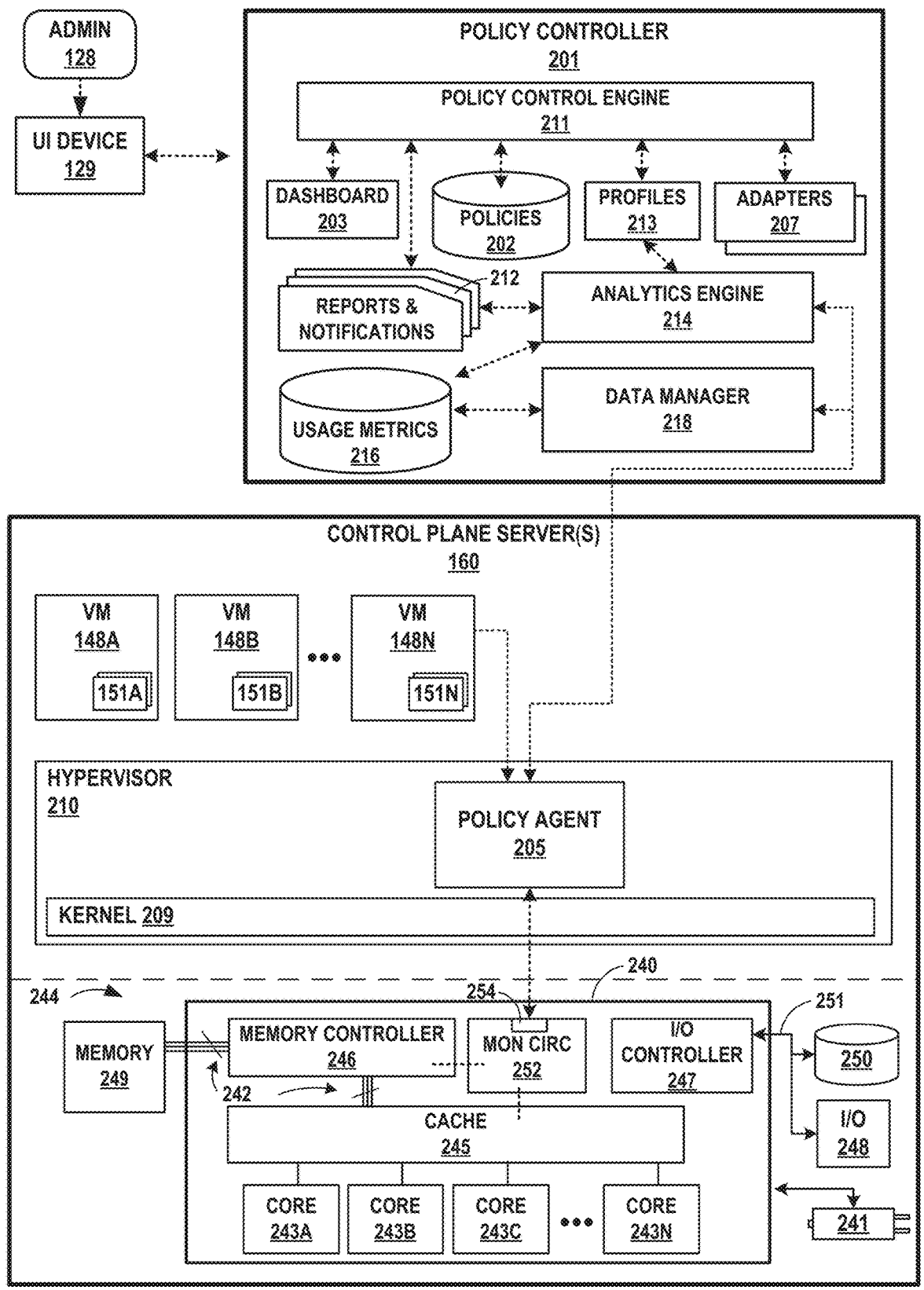
FIG. 3 is a block diagram illustrating a portion of the example data center of FIG. 1 in further detail, in accordance with one or more aspects of the present disclosure.

FIG. 3 is a block diagrams illustrating a portion of the example data center of FIG. 1 in further detail, in accordance with one or more aspects of the present disclosure. FIG. 3 illustrates user interface device 129 (operated by administrator 128), policy controller 201, and control plane server 160.

Policy controller 201 may represent a collection of tools, systems, devices, and modules that perform operations in accordance with one or more aspects of the present disclosure. Policy controller 201 may perform cloud service optimization services, which may include advanced monitoring, scheduling, and performance management for software-defined infrastructure, where containers and virtual machines (VMs) can have life cycles much shorter than in traditional development environments. Policy controller 201 may leverage big-data analytics and machine learning in a distributed architecture (e.g., data center 110). Policy controller 201 may provide near real-time and historic monitoring, performance visibility and dynamic optimization. Policy controller 201 of FIG. 3 may be implemented in a manner consistent with the description of policy controller 201 provided in connection with FIG. 1.

Policy controller 201 includes policies 202 and dashboard 203, as illustrated in FIG. 1. Policies 202 and dashboard 203 may also be implemented in a manner consistent with the description of policies 202 and dashboard 203 provided in connection with FIG. 1. In some examples, as illustrated in FIG. 3, policies 202 may be implemented as a data store. In such an example, policies 202 may represent any suitable data structure or storage medium for storing policies 202 and/or data relating to policies 202. Policies 202 may be primarily maintained by policy control engine 211, and policies 202 may, in some examples, be implemented through a NoSQL database.

In this example, policy controller 201 of FIG. 3 further includes policy control engine 211, adapter 207, reports and notifications 212, analytics engine 214, usage metrics data store 216, and data manager 218.

Policy control engine 211 may be configured to control interaction between one or more components of policy controller 201, in accordance with one or more aspects of the present disclosure. For example, policy control engine 211 may create and/or update dashboard 203, administer policies 202, and control adapters 207. Policy control engine 211 may also cause analytics engine 214 to generate reports and notifications 212 based on data from usage metrics data store 216, and may deliver one or more reports and notifications 212 to user interface device 129 and/or other systems or components of data center 110.

Reports and notifications 212 may be created, maintained, and/or updated via one or more components of policy controller 201. In some examples, reports and notifications 212 may include data presented within dashboard 203, and may include data illustrating how infrastructure resources are consumed by instances over time. Notifications may be based on alarms, as further described below, and notifications may be presented through dashboard 203 or through other means.

One or more reports may be generated for a specified time period. In some examples, such a report may show the resource utilization by each instance that is in a project or scheduled on a host. Dashboard 203 may include data presenting a report in both graphical or tabular formats. Dashboard 203 may further enable report data to be downloaded as an HTML-formatted report, a raw comma-separated value (CSV) file, or an JSON-formatted data for further analysis.

Reports and notifications 212 may include a variety of reports, including a project report or a host report, each of which may be included within dashboard 203. A project report may be generated for a single project or for all projects (provided administrator 128 is authorized to access the project or all projects). A project report may show resource allocations, actual usage, and charges. Resource allocations may include static allocations of resources, such as vCPUs, floating IP addresses, and storage volumes. Actual resource usage may be displayed within dashboard 203 for each instance in the project, and as the aggregate sum of usage by all instances in the project. Resource usage may show the actual physical resources consumed by an instance, such as CPU usage percentage, memory usage percentage, network I/O, and disk I/O.

As one example, policy control engine 211 may direct analytics engine 214 to generate a host report for all hosts or the set of hosts in a host aggregate, such as a cloud computing environment. In some examples, only users with an administrator role may generate a host report. A host report may show the aggregate resource usage of a host, and a breakdown of resource usage by each instance scheduled on a host.

In some examples, policy controller 201 may configure an alarm, and may generate an alarm notification when a condition is met by one or more control plane usage metrics, data plane usage metrics, or both. Policy agent 205 may monitor control plane usage metrics at control plane servers 160 and virtual machines 148, and analyze the raw data corresponding to the control plane usage metrics for conditions of alarms that apply to those control plane servers 160 and/or virtual machines 148. As another example, policy agent 206 may monitor data plane usage metrics and analyze the raw data corresponding to the data plane usage metrics for conditions of alarms that apply to the data plane usage metrics for network devices 152 and/or forwarding units 56. In some examples, alarms may apply to a specified "scope" that identifies the type of element to monitor for a condition. Such element may be a "host," "instance," or "service," for example. An alarm may apply to one or more of such element. For instance, an alarm may apply to all control plane servers 160 within data center 110, or to all control planer servers 160 within a specified aggregate (e.g., clusters of servers 160 or virtual machines 148).

Policy agent 205 may collect measurements of control plane usage metrics for a particular VM 148 of control plane servers 160, and its instances. Policy agent 205 may continuously collect measurements or may periodically poll control plane server 160 (e.g., every one second, every five seconds, etc.). For a particular alarm, policy agent 205 may aggregate samples according to a user-specified function (average, standard deviation, min, max, sum) and produce a single measurement for each user-specified interval. Policy agent 205 may compare each same and/or measurement to a threshold. In some examples, a threshold evaluated by an alarm or a policy that includes conditions for an alarm may be either a static threshold or a dynamic threshold. For a static threshold, policy agent 205 may compare metrics or raw data corresponding to metrics to a fixed value. For instance, policy agent 205 may compare metrics to a fixed value using a user-specified comparison function (above, below, equal). For a dynamic threshold, policy agent 205 may compare metrics or raw data correspond to metrics to a historical trend value or historical baseline for a set of resources. For instance, policy agent 205 may compare metrics or other measurements with a value learned by policy agent 205 over time.

Similarly, policy agent 206 may monitor data plane usage metrics for a network device 152 or a subset of forwarding units 56 of a network device 152. For example, network device 152 may push measurements for data plane usage metrics to agent 206. Agent 206 may receive the measurements for the data plane usage metrics periodically. Policy agent 206 may compare the measurements for the data plane usage metrics to a threshold (e.g., static or dynamic threshold) in a manner similar to policy agent 205.

In some example implementations, policy controller 201 is configured to apply dynamic thresholds, which enable outlier detection in data plane usage metrics and/or control plane usage metrics based on historical trends. For example, usage metrics may vary significantly at various hours of the day and days of the week. This may make it difficult to set a static threshold for a metric. For example, 70% CPU usage may be considered normal for Monday mornings between 10:00 AM and 12:00 PM, but the same amount of CPU usage may be considered abnormally high for Saturday nights between 9:00 PM and 10:00 PM. With dynamic thresholds, policy agents 205, 206 may learn trends in metrics across all resources in scope to which an alarm applies. Then, policy agents 205, 206 may generate an alarm when a measurement deviates from the baseline value learned for a particular time period. Alarms having a dynamic threshold may be configured by metric, period of time over which to establish a baseline, and sensitivity. Policy agents 205, 206 may apply the sensitivity setting to measurements that deviate from a baseline, and may be configured as "high," "medium," or "low" sensitivity. An alarm configured with "high" sensitivity may result in policy agents 205, 206 reporting to policy controller 201 smaller deviations from a baseline value than an alarm configured with "low" sensitivity.

In some examples, basic configuration settings for an alarm may include a name that identifies the alarm, a scope (type of resource to which an alarm applies, such as "host" or "instance"), an aggregate (a set of resources to which the alarm applies), a metric (e.g., the metric that will be monitored by policy agents 205, 206), an aggregation function (e.g., how policy agents 205, 206 may combine samples during each measurement interval—examples include average, maximum, minimum, sum, and standard deviation functions), a comparison function (e.g., how to compare a measurement to the threshold, such as whether a measurement is above, below, or equal to a threshold), a threshold (the value to which a metric measurement is compared), a unit type (determined by the metric type), and an interval (duration of the measurement interval in seconds or other unit of time).

An alarm may define a policy that applies to a set of elements that are monitored, such as virtual machines. A notification is generated when the condition of an alarm is observed for a given element. A user may configure an alarm to post notifications to an external HTTP endpoint. Policy controller 201 and/or policy agents 205, 206 may POST a JSON payload to the endpoint for each notification. The schema of the payload may be represented by the following, where "string" and 0 are generic placeholders to indicate type of value; string and number, respectively:

```
{
  "apiVersion": "v1",
  "kind": "Alarm",
  "spec": {
    "name": "string",
    "eventRuleId": "string",
    "severity": "string",
    "metricType": "string",
    "mode": "string",
    "module": "string",
    "aggregationFunction": "string",
    "comparisonFunction": "string",
    "threshold": 0,
    "intervalDuration": 0,
    "intervalCount": 0,
    "intervalsWithException": 0,
  },
  "status": {
    "timestamp": 0,
    "state": "string",
    "elementType": "string",
    "elementId": "string",
    "elementDetails": { }
  }
}
```

In some examples, the "spec" object describes the alarm configuration for which this notification is generated. In some examples, the "status" object describes the temporal event data for this particular notification, such as the time when the condition was observed and the element on which the condition was observed.

The schema represented above may have the following values for each field:

severity: "critical", "error", "warning", "data", "none"
metricType: refer to Metrics.
mode: "alarm", "event"
module: the Analytics modules that generated the alarm. One of "alarms", "health/risk", "service_alarms".
state: state of the alarm. For "alarm" mode alarms, valid values are "active", "inactive", "learning". For "event" mode
alarms, the state is always "triggered".
threshold: units of threshold correspond to metricType.
elementType: type of the entity. One of "instance", "host", "service".
elementId: UUID of the entity.
elementDetails: supplemental details about an entity.
The contents of this object depend
on the elementType. For a "host" or "service",
the object is empty. For an "instance", the
object may contain hostId and projectId.
```
{
  "elementDetails": {
    "hostId": "uuid",
    "projectId": "uuid"
  }
}
```

Analytics engine 214 may perform analysis, machine learning, and other functions on or relating to data stored within usage metrics data store 216. Analytics engine 214 may further generate reports, notifications, and alarms based on such data. For instance, analytics engine 214 may analyze data stored in usage metrics data store 216 and identify, based on data about internal processor metrics, one or more virtual machines 148 that are operating in a manner that may adversely affect the operation of other virtual machines 148 executing on control plane server 160. Analytics engine 214 may, in response to identifying one or more virtual machines 148 operating in a manner that may adversely affect the operation of other virtual machines 148, generate one or more reports and notifications 212. Analytics engine 214 may alternatively, or in addition, raise an alarm and/or cause or instruct policy agent 205 to take actions to address the operation of the identified virtual machines 148. Analytics engine 214 may also analyze the metrics for one or more virtual machines 148, and based on this analysis, characterize one or more of virtual machines 148 in terms of the shared resources each of virtual machines 148 tends to consume. For instance, analytics engine 214 may characterize one or more virtual machines 148 as CPU bound, memory bound, or cache bound.

Usage metrics data store 216 may represent any suitable data structure or storage medium for storing data related to metrics collected by policy agents 205, 206, such as control plane usage metrics and data plane usage metrics. For instance, usage metrics data store 216 may be implemented using a NoSQL database. The data stored in usage metrics data store 216 may be searchable and/or categorized such that analytics engine 214, data manager 218, or another component or module of policy controller 201 may provide an input requesting data from usage metrics data store 216, and in response to the input, receive data stored within usage metrics data store 216. Usage metrics data store 216 may be primarily maintained by data manager 218.

In some examples, a "metric" is a measured value for a resource in the infrastructure. Policy agent 205 may collect and calculate metrics for resources utilized by control plane servers 160 or VMs 148 and policy agents 206 may collect and calculate metrics for network device 152 or forwarding units 56. Metrics may be organized into hierarchical categories based on the type of metric. Some metrics are percentages of total capacity. In such cases, the category of the metric determines the total capacity by which the percentage is computed. For instance, host.cpu.usage indicates the percentage of CPU consumed relative to the total CPU available on a host. In contrast, instance.cpu.usage is the percentage of CPU consumed relative to the total CPU available to an instance. As an example, consider an instance that is using 50% of one core on a host with 20 cores. The instance's host.cpu.usage will be 2.5%. If the instance has been allocated 2 cores, then its instance.cpu.usage will be 25%.

An alarm may be configured for any metric. Many metrics may also be displayed in user interfaces within dashboard 203, in, for example, a chart-based form. When an alarm triggers for a metric, the alarm may be plotted on a chart at the time of the event. In this way, metrics that might not be plotted directly as a chart may still visually correlated in time with other metrics. In the following examples, a host may use one or more resources, e.g., CPU ("cpu") and network ("network"), that each have one or more associated metrics, e.g., memory bandwidth ("mem_bw") and usage ("usage"). Similarly, an instance may use one or more resources, e.g., virtual CPU ("cpu") and network ("network"), that each have one or more associated metrics, e.g., memory bandwidth ("mem_bw") and usage ("usage"). An instance may itself be a resource of a host or an instance aggregate, a host may itself be a resource of a host aggregate, and so forth.

In some examples, raw metrics available for hosts may include: host.cpu.io_wait, host.cpu.ipc, host.cpu.l3_cache.miss, host.cpu.l3_cache.usage, host.cpu.mem_bw.local, host.cpu.mem_bw.remote , host.cpu.mem_bw.total , host.cpu.usage, host.disk.io.read, host.disk.io.write, host.disk.response_time, host.disk.read_response_time, host.disk.write_response_time, host.disk.smart.hdd.command_timeout, host.disk.smart.hdd.current_pending_sector_count, host.disk.smart.hdd.offline_uncorrectable, host.disk.smart.hdd.reallocated_sector_count, host.disk.smart.hdd.reported_uncorrectable_errors, host.disk.smart.ssd.available_reserved_space, host.disk.smart.ssd.media_wearout_indicator, host.disk.smart.ssd.reallocated_sector_count, host.disk.smart.ssd.wear_leveling_count, host.disk.usage.bytes, host.disk.usage.percent, host.memory.usage, host.memory.swap.usage, host.memory.dirty.rate, host.memory.page_fault.rate, host.memory.page_in_out.rate, host.network.egress.bit_rate, host.network.egress.drops, host.network.egress.errors, host.network.egress.packet_rate, host.network.ingress.bit_rate, host.network.ingress.drops, host.network.ingress.errors, host.network.ingress.packet_rate, host.network.ipv4Tables.rule_count, host.network.ipv6Tables.rule_count, openstack.host.disk_allocated, openstack.host.memory_allocated, and openstack.host.vcpus_allocated.

In some examples, calculated metrics available for hosts include: host.cpu.normalized_load_1M, host.cpu.normalized_load_5M, host.cpu.normalized_load_15M, host.cpu.temperature, host.disk.smart.predict_failure, and host.heartbeat.

For example, host.cpu.normalized_load is a normalized load value that may be calculated as a ratio of the number of running and ready-to-run threads to the number of CPU cores. This family of metrics may indicate the level of demand for CPU. If the value exceeds 1, then more threads are ready to run than exists CPU cores to perform the execution. Normalized load may be a provided as an average over 1-minute, 5-minute, and 15-minute intervals.

The metric host.cpu.temperature is a CPU temperature value that may be derived from multiple temperature sensors in the processor(s) and chassis. This temperature provides a general indicator of temperature in degrees Celsius inside a physical host.

The metric host.disk.smart.predict_failure is a value that one or more policy agents 205 may calculate using multiple S.M.A.R.T. counters provided by disk hardware. Policy agent 205 may set predict_failure to true (value=1) when it determines from a combination of S.M.A.R.T. counters that a disk is likely to fail. An alarm triggered for this metric may contain the disk identifier in the metadata.

The metric host.heartbeat is a value that may indicate if policy agent 205, 206 is functioning on a host. Policy controller 201 may periodically check the status of each host by making a status request to each of policy agents 205, 206. The host.heartbeat metric is incremented for each successful response. Alarms may be configured to detect missed heartbeats over a given interval.

In some examples, the following raw metrics may be available for instances: instance.cpu.usage, instance.cpu.ipc, instance.cpu.l3_cache.miss, instance.cpu.l3_cache.usage, instance.cpu.mem_bw.local, instance.cpu.mem_bw.remote, instance.cpu.mem_bw.total, instance.disk.io.read, instance.disk.io.write, instance.disk.usage, instance.disk.usage.gb, instance.memory.usage, instance.network.egress.bit_rate, instance.network.egress.drops, instance.network.egress.errors, instance.network.egress.packet_rate, instance.network.egress.total_bytes, instance.network.egress.total_packets, instance.network.ingress.bit_rate, instance.network.ingress.drops, instance.network.ingress.errors, instance.network.ingress.packet_rate, and instance.network.ingress.total_bytes, and instance.network.ingress.total_packets.

Data manager 218 provides a messaging mechanism for communicating with policy agents 205, 206 deployed in control plane servers 160 and data plane proxy servers 162, respectively. Data manager 218 may, for example, issue messages to configure and program policy agents, and may manage metrics and other data received from policy agents 205, 206, and store some or all of such data within usage metrics data store 216. Data manager 218 may receive, for example, raw metrics (e.g., control plane usage metrics and/or data plane usage metrics) from one or more policy agents 205, 206. Data manager 218 may, alternatively or in addition, receive results of analysis performed by policy agent 205, 206 on raw metrics. Data manager 218 may, alternatively or in addition, receive data relating to patterns of usage of one or more input/output devices 248 that may be used to classify one or more input/output devices 248. Data manager 218 may store some or all of such data within usage metrics data store 216.

In the example of FIG. 3, control plane server 160 represents a physical computing node that provides an execution environment for virtual hosts, such as VMs 148. That is, control plane server 160 includes an underlying physical compute hardware 244 including one or more physical microprocessors 240, memory 249 such as DRAM, power source 241, one or more input/output devices 248, and one or more storage devices 250. As shown in FIG. 3, physical compute hardware 244 provides an environment of execution for hypervisor 210, which is a software and/or firmware layer that provides a light weight kernel 209 and operates to provide a virtualized operating environments for virtual machines 148, containers, and/or other types of virtual hosts. Control plane server 160 may represent one of control plane servers 160 illustrated in FIG. 1.

In the example shown, processor 240 is an integrated circuit having one or more internal processor cores 243 for executing instructions, one or more internal caches or cache devices 245, memory controller 246, and input/output controller 247. Although in the example of FIG. 3, servers 160 are illustrated with only one processor 240, in other examples, servers 160 may include multiple processors 240, each of which may include multiple processor cores.

One or more of the devices, modules, storage areas, or other components of servers 160 may be interconnected to enable inter-component communications (physically, communicatively, and/or operatively). For instance, cores 243 may read and write data to/from memory 249 via memory controller 246, which provides a shared interface to memory bus 242. Input/output controller 247 may communicate with one or more input/output devices 248, and/or one or more storage devices 250 over input/output bus 251. In some examples, certain aspects of such connectivity may be provided through communication channels that include a system bus, a network connection, an inter-process communication data structure, or any other method for communicating data or control signals.

Within processor 240, each of processor cores 243A-243N (collectively "processor cores 243") provides an independent execution unit to perform instructions that conform to an instruction set architecture for the processor core. Servers 160 may include any number of physical processors and any number of internal processor cores 243. Typically, each of processor cores 243 are combined as multi-core processors (or "many-core" processors) using a single IC (i.e., a chip multiprocessor).

In some instances, a physical address space for a computer-readable storage medium may be shared among one or more processor cores 243 (i.e., a shared memory). For example, processor cores 243 may be connected via memory bus 242 to one or more DRAM packages, modules, and/or chips (also not shown) that present a physical address space accessible by processor cores 243. While this physical address space may offer the lowest memory access time to processor cores 243 of any of portions of memory 249, at least some of the remaining portions of memory 249 may be directly accessible to processor cores 243.

Memory controller 246 may include hardware and/or firmware for enabling processor cores 243 to communicate with memory 249 over memory bus 242. In the example shown, memory controller 246 is an integrated memory controller, and may be physically implemented (e.g., as hardware) on processor 240. In other examples, however, memory controller 246 may be implemented separately or in a different manner, and might not be integrated into processor 240.

Input/output controller 247 may include hardware, software, and/or firmware for enabling processor cores 243 to communicate with and/or interact with one or more components connected to input/output bus 251. In the example shown, input/output controller 247 is an integrated input/output controller, and may be physically implemented (e.g., as hardware) on processor 240. In other examples, however, memory controller 246 may also be implemented separately and/or in a different manner, and might not be integrated into processor 240.

Cache 245 represents a memory resource internal to processor 240 that is shared among processor cores 243. In some examples, cache 245 may include a Level 1, Level 2, or Level 3 cache, or a combination thereof, and may offer the lowest-latency memory access of any of the storage media accessible by processor cores 243. In most examples described herein, however, cache 245 represents a Level 3 cache, which, unlike a Level 1 cache and/or Level 2 cache, is often shared among multiple processor cores in a modern multi-core processor chip. However, in accordance with one or more aspects of the present disclosure, at least some of the techniques described herein may, in some examples, apply to other shared resources, including other shared memory spaces beyond the Level 3 cache.

Power source 241 provides power to one or more components of servers 160. Power source 241 typically receives power from the primary alternative current (AC) power supply in a data center, building, or other location. Power source 241 may be shared among numerous servers 160 and/or other network devices or infrastructure systems within data center 110. Power source 241 may have intelligent power management or consumption capabilities, and such features may be controlled, accessed, or adjusted by one or more modules of servers 160 and/or by one or more processor cores 243 to intelligently consume, allocate, supply, or otherwise manage power.

One or more storage devices 250 may represent computer readable storage media that includes volatile and/or non-volatile, removable and/or non-removable media implemented in any method or technology for storage of data such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired data and that can be accessed by processor cores 243.

One or more input/output devices 248 may represent any input or output devices of servers 160. In such examples, input/output devices 248 may generate, receive, and/or process input from any type of device capable of detecting input from a human or machine. For example, one or more input/output devices 248 may generate, receive, and/or process input in the form of physical, audio, image, and/or visual input (e.g., keyboard, microphone, camera). One or more input/output devices 248 may generate, present, and/or process output through any type of device capable of producing output. For example, one or more input/output devices 248 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

Memory 249 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory 249 provides a physical address space composed of addressable memory locations. Memory 249 may in some examples present a non-uniform memory access (NUMA) architecture to processor cores 243. That is, processor cores 243 might not have equal memory access time to the various storage media that constitute memory 249. Processor cores 243 may be configured in some instances to use the portions of memory 249 that offer the lower memory latency for the cores to reduce overall memory latency.

Kernel 209 may be an operating system kernel that executes in kernel space and may include, for example, a Linux, Berkeley Software Distribution (BSD), or another Unix-variant kernel, or a Windows server operating system kernel, available from Microsoft Corp. In general, processor cores 243, storage devices (e.g., cache 245, memory 249, and/or storage device 250), and kernel 209 may store instructions and/or data and may provide an operating environment for execution of such instructions and/or modules of servers 160. Such modules may be implemented as software, but may in some examples include any combination of hardware, firmware, and software. The combination of processor cores 243, storage devices within servers 160 (e.g., cache 245, memory 249, and/or storage device 250), and kernel 209 may retrieve, store, and/or execute the instructions and/or data of one or more applications, modules, or software. Processor cores 243 and/or such storage devices may also be operably coupled to one or more other software and/or hardware components, including, but not limited to, one or more of the components of servers 160 and/or one or more devices or systems illustrated as being connected to servers 160.

Hypervisor 210 is an operating system-level component that executes on hardware platform 244 to create and runs one or more virtual machines 148. In the example of FIG. 3, hypervisor 210 may incorporate the functionality of kernel 209 (e.g., a "type 1 hypervisor"). In other examples, hypervisor 210 may execute on kernel 209 (e.g., a "type 2 hypervisor"). In some situations, hypervisor 210 may be referred to as a virtual machine manager (VMM). Example hypervisors include Kernel-based Virtual Machine (KVM) for the Linux kernel, Xen, ESXi available from VMware, Windows Hyper-V available from Microsoft, and other open-source and proprietary hypervisors.

In accordance with techniques of this disclosure, policy agent 205 of control plane server 160 may detect one or more VMs 148 that are executing on control plane servers 160 and dynamically associate each respective VM 148 with a particular one of network devices 152 or a subset of forwarding units of the particular network device 152. Policy agent 205 may determine that a particular VM (e.g., VM 148A) provides control plane functionality for a network device or subset of forwarding units of a network device by invoking a virtualization utility 66, as described above with reference to FIG. 2. Policy agent 205 may output, to policy controller 201, data associating a VM 148A with the one or more forwarding units of network device 152. For example, policy agent 205 may output a unique identifier corresponding to VM 148, a unique identifier corresponding to the associated network device 152 or subset of forwarding units, and data linking or associating the respective unique identifiers (e.g., such as a mapping table or other data structure).

Policy agents 205, 206 may execute as part of hypervisor 210, or may execute within kernel space or as part of kernel 209. Policy agent 205 may monitor some or all of the control plane usage metrics associated with control plane server 160. Among other metrics for control plane server 160, policy agent 205 is configured to monitor control plane usage metrics that relate to or describe usage of resources shared internal to processor 240 by each of processes 151 executing on processor cores 243 within multi-core processor 240 of server 160. In some examples, such internal processor metrics relate to usage of cache 245 (e.g., a L3 cache) or usage of bandwidth on memory bus 242. To access and monitor the internal processor metrics, policy agent 205 may interrogate processor 240 through a specialized hardware interface 254 that is exposed by APIs of kernel 209. For example, policy agent 205 may access or manipulate one or more hardware registers of processor cores 243 to program monitoring circuit ("MON CIRC") 252 of processor 240 for internally monitoring shared resources and for reporting, via the interface, usage metrics for those resources. Policy agent 205 may access and manipulate the hardware interface of processor 240 by invoking kernel, operating system, and/or hypervisor calls. For example, the hardware interface of processor 240 may be memory mapped via kernel 209 such that the programmable registers of processor 240 for monitoring internal resources of the processor may be read and written by memory access instructions directed to particular memory addresses. In response to such direction by policy agent 205, monitoring circuitry 252 internal to processor 240 may monitor execution of processor cores 243, and communicate to policy agent 205 or otherwise make available to policy agent 205 information about internal processor metrics for each of the processes 151.

Policy agent 205 may also generate and maintain a mapping that associates processor metrics for processes 151 to one or more virtual machines 148, such as by correlation with process identifiers (PIDs) or other data maintained by kernel 209. In other examples, policy agent 205 may assist policy controller 201 in generating and maintaining such a mapping. Policy agent 205 may, at the direction of policy controller 201, enforce one or more policies 202 at server 160 responsive to usage metrics obtained for resources shared internal to a physical processor 240 and/or further based on other control plane usage metrics for resources external to processor 240.

Policy agent 206 may monitor some or all of the data plane usage metrics associated with a network device or set of forwarding units. For example, policy agent 206 may receive, from network device 152, data plane usage metrics (e.g., once every second, once every thirty seconds, once every minute, etc.) as described above.

In some example implementations, servers 160, 162 may include an orchestration agent (not shown in FIGS. 3, 4) that communicates directly with orchestration engine 130. For example, responsive to instructions from orchestration engine 130, the orchestration agent communicates attributes of the particular virtual machines 148 executing on each of the respective servers 160, 162, and may create or terminate individual virtual machines.

Virtual machines 148A-148N (collectively "virtual machines 148" or "VMs 148") may represent example instances of virtual machines 148. Servers 160 may partition the virtual and/or physical address space provided by memory 249 and/or provided by storage device 250 into user space for running user processes. Servers 160 may also partition virtual and/or physical address space provided by memory 249 and/or storage device 250 into kernel space, which is protected and may be inaccessible by user processes.

In general, each of virtual machines 148 may be any type of software application and each may be assigned a virtual address for use within a corresponding virtual network, where each of the virtual networks may be a different virtual subnet provided by virtual router 142. Each of virtual machines 148 may be assigned its own virtual layer three (L3) IP address, for example, for sending and receiving communications but is unaware of an IP address of the physical server on which the virtual machine is executing. In this way, a "virtual address" is an address for an application that differs from the logical address for the underlying, physical computer system, e.g., servers 160.

Processes 151A, processes 151B, through processes 151N (collectively "processes 151") may each execute within one or more virtual machines 148. For example, one or more processes 151A may correspond to virtual machine 148A, or may correspond to an application or a thread of an application executed within virtual machine 148A. Similarly, a different set of processes 151B may correspond to virtual machine 148B, or to an application or a thread of an application executed within virtual machine 148B. In some examples, each of processes 151 may be a thread of execution or other execution unit controlled and/or created by an application associated with one of virtual machines 148. In some scenarios, each of processes 151 of VMs 148 of control plane server 160 may be associated with a process identifier that is used by processor cores 243 to identify each of processes 151 when reporting one or more metrics, such as internal processor metrics collected by policy agent 205 of control plane server 160. In the example of FIG. 3, processes 151 of VMs 148 of control plane server 160 may provide control plane functionality for a network device or a subset of forwarding planes of the network device.

In operation, hypervisor 210 of servers 160 may create a number of processes that share resources of respective servers 160. For example, hypervisor 210 may (e.g., at the direction of orchestration engine 130) instantiate or start one or more virtual machines 148 on servers 160. Each of virtual machines 148 may execute one or more processes 151, and each of those software processes may execute on one or more processor cores 243 within hardware processor 240 of server 160. For instance, virtual machine 148A may execute processes 151A, virtual machine 148B may execute processes 151B, and virtual machines 148N may execute processes 151N. In the example of FIG. 3, processes 151A, processes 151B, and processes 151N (collectively "processes 151") all execute on the same physical host (e.g., server 160) and may share certain resources while executing on server 160. For instance, processes executing on processor cores 243 may share memory bus 242, memory 249, input/output devices 248, storage device 250, cache 245, memory controller 246, input/output controller 247, and/or other resources.

Kernel 209 (or a hypervisor 210 that implements kernel 209) may schedule processes to execute on processor cores 243. For example, kernel 209 may schedule, for execution on processor cores 243, processes 151 belonging to one or more virtual machines 148. One or more processes 151 may execute on one or more processor cores 243, and kernel 209 may periodically preempt one or more processes 151 to schedule another of the processes 151. Accordingly, kernel 209 may periodically perform a context switch to begin or resume execution of a different one of the processes 151. Kernel 209 may maintain a queue that it uses to identify the next process to schedule for execution, and kernel 209 may place the previous process back in the queue for later execution. In some examples, kernel 209 may schedule processes on a round-robin or other basis. When the next process in the queue begins executing, that next process has access to shared resources used by the previous processes, including, for example, cache 245, memory bus 242, and/or memory 249.

As described herein, policy agent 205 may determine control plane usage metrics for resources of one or more VMs 148 of control plane server 160. Policy agent 205 may monitor shared resources, such as memory, CPU, etc. In some examples, policy agent 205 may monitor shared use of resources that are internal to processor 240, as described in U.S. patent application Ser. No. 15/846,400, filed Dec. 19, 2017, and entitled MULTI-CLUSTER DASHBOARD FOR DISTRIBUTED VIRTUALIZATION INFRASTRUCTURE ELEMENT MONITORING AND POLICY CONTROL, which is incorporated by reference as if fully set forth herein.

In some examples, policy agent 205 outputs data associated with the control plane usage metrics. In some examples, the data associated with the control plane usage metrics includes at least a portion of the control plane usage metrics for a particular VM (e.g., VM 148A) and data associating the VM 148A with the one or more forwarding units. The data associating the particular virtual machine with the one or more forwarding units may include data identifying VM 148A and data identifying a network device or subset of forwarding units for which VM 148A provides control plane functionality (e.g., a mapping table or other data structure). In such examples, policy controller 201 may analyze the control plane usage metrics to determine whether one or more usage metrics satisfy a threshold defined by one or more policies 202.

In another example, the data associated with the control plane usage metrics includes data indicating whether one or more control plane usage metrics satisfies a threshold. For example, policy agent 205 may analyze the control plane usage metrics for VM 148A to determine whether any of the usage metrics satisfy a respective threshold by one or more policies 202. Policy agent 205 may output data indicating whether any of the usage metrics for VM 148A satisfy the respective threshold and data associating the particular virtual machine with the one or more forwarding units.

Policy controller 201 may receive data output by policy agents 205, 206. Responsive to receiving the data output by policy agents 205, 206, policy controller 201 may determine whether one or more composite policies are satisfied. A composite policy may define one or more respective thresholds for the control plane usage metrics and data plane usage metrics associated with a network device or subset of forwarding units of the network device, as well as one or more actions to take in response to determining that one or more control plane usage metrics satisfy a respective threshold and that one or more data plane usage metrics satisfy a respective threshold. For example, a composite policy may define a threshold CPU usage for a VM providing a control plane for network device 152 and a threshold quantity of packets dropped by the network device 152. In such an example, the composite policy may define an action as instantiating one or more additional VMs 148 and distributing the load across the additional VMs. As another example, a composite policy may define a threshold memory usage for a VM providing the control plane for a subset of forwarding units (e.g., forwarding unit 56A) and a threshold quantity of OSPF routes. In such an example, the composite policy may define an action as removing some OSPF routes.

Responsive to determining that a composite policy is satisfied (e.g., one or more control plane usage metrics satisfy a respective threshold and one or more data plane usage metrics satisfy a respective threshold), policy agents 205 and/or 206 may perform an action defined by the policy. For example, policy agent 205 may instantiate or start one or more additional VMs 148. As another example, policy agent 206 may remove one or more OSPF routes.

In some examples, policy agents 205, 206 and/or policy controller 201 may generate an alarm in response to determining that a composite policy is satisfied. For example, policy controller 201 may output, to dashboard 203, a notification indicating abnormal activity with a particular VM, network device, or subset of forwarding units. As one example, policy controller 201 may cause dashboard 203 to output a graphical user interface indicating the performance of network device 152 is substandard or that network device 152 has experienced an error.

Policy controller 201 may output data indicative of the control plane usage metrics for a particular network device 152 or subset of forwarding units and data indicative of the data plane usage metrics for the particular network device 152 or subset of forwarding units as a single graphical user interface. For example, policy controller 201 may determine, based on the data identifying the network device associated with the control plane usage metrics and the data identifying the network device associated with the data plane usage metrics, that the control plane usage metrics correspond to the same network device as the data plane usage metrics. Thus, policy controller 201 may cause dashboard 203 to output a graphical user interface that includes data plane usage metrics and control plane usage metrics for a single network device in a single GUI.

In some examples, policy controller 201 may output control plane usage metrics for two or more VMs 148 corresponding to same network device 152 or subset of forwarding units as a single graphical user interface. For example, policy controller 201 may determine, based on the data identifying the network device associated with the control plane usage metrics for VM 148A and the data identifying the network device associated with the control plane usage metrics for VM 148B, that the control plane usage metrics for VMs 148A and 148B correspond to the same network device. Thus, policy controller 201 may cause dashboard 203 to output a graphical user interface that includes the control plane usage metrics for VM 148A and 148B in a single GUI.

Figure 4:
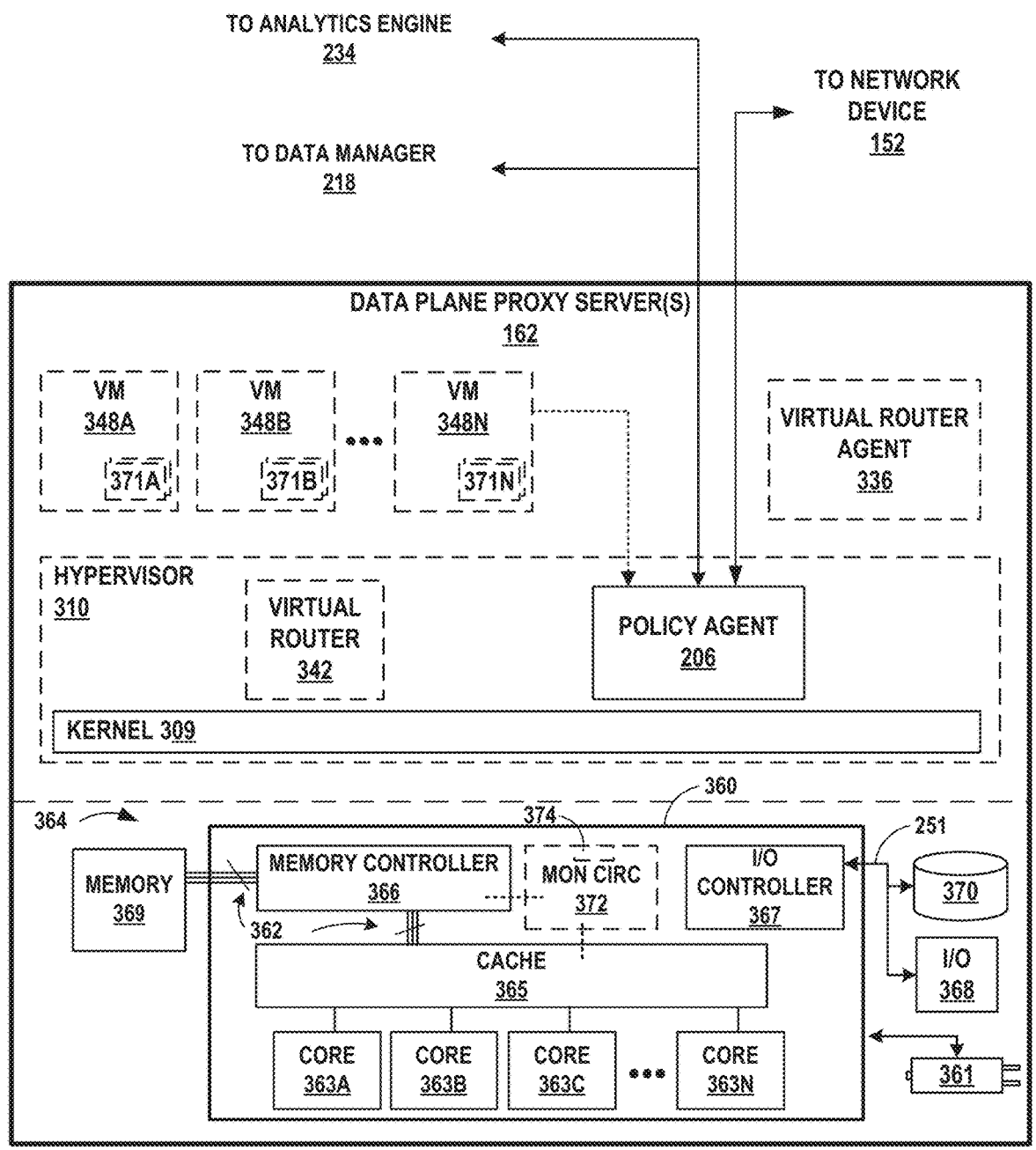
FIG. 4 is a block diagram illustrating a portion of the example data center of FIG. 1 in further detail, in accordance with one or more aspects of the present disclosure.

FIG. 4 is a block diagrams illustrating a portion of the example data center of FIG. 1 in further detail, in accordance with one or more aspects of the present disclosure. FIG. 4 illustrates data plane proxy server 162.

Data plane proxy server 162 may include hardware 364, which may correspond to hardware 244 of control plane server 160 described with reference to 3. For example, data plane proxy servers 162 may include one or more processors 360 and memory 369, which may be similar to processors 240 and memory 249 of control plane servers 160. Memory bus 362 may be similar to memory bus 242, memory control 366 may be similar to memory controller 246, monitoring circuit 372 and hardware interface 374 may be similar to monitoring circuit 252 and hardware interface 254, respectively. I/O controller 367 may be similar to I/O controller 247, cache 365 may be similar to cache 245, and cores 363A-363N may be similar to cores 243A-243N of control plane servers 160. Power source 361 may be similar to power source 241, I/O device 368 may be similar to I/O device 248, and storage devices 370 may be similar to storage device 250 of control plane servers 160.

Data plane proxy servers 162 include kernel 309, which may be similar to kernel 209 of control plane servers 160. In some examples, data plane proxy servers 162 may include virtual machines 348A-348N (collectively, virtual routers 348), which may be similar to VMs 148 of control plane servers 160. Virtual machines 348 may include processes 371, which may be similar to processes 251. Data plane proxy server 162 may include virtual router 342 that executes within hypervisor 310. Virtual router 342 may manage one or more virtual networks, each of which may provide a network environment for execution of virtual machines 348 on top of the virtualization platform provided by hypervisor 310. Each of the virtual machines 348 may be associated with one of the virtual networks. Data plane proxy servers 162 may include a virtual router agent 336 configured to monitor resources utilized by virtual router 342.

Policy agent 206 may output data associated with the data plane usage metrics. In some examples, policy agent 206 outputs data identifying the network device or subset of forwarding units associated with the data plane usage metrics and at least a portion of the raw data plane usage metrics such that policy controller 201 may analyze the data plane usage metrics. As another example, policy agent 206 may analyze the data plane usage metrics to determine whether any of the usage metrics satisfy a threshold defined by one or more policies 202. In such examples, policy agent 206 may output data identifying the network device or subset of forwarding units associated with the data plane usage metrics and data indicating whether any of the usage metrics satisfy a respective threshold.

Figure 5:
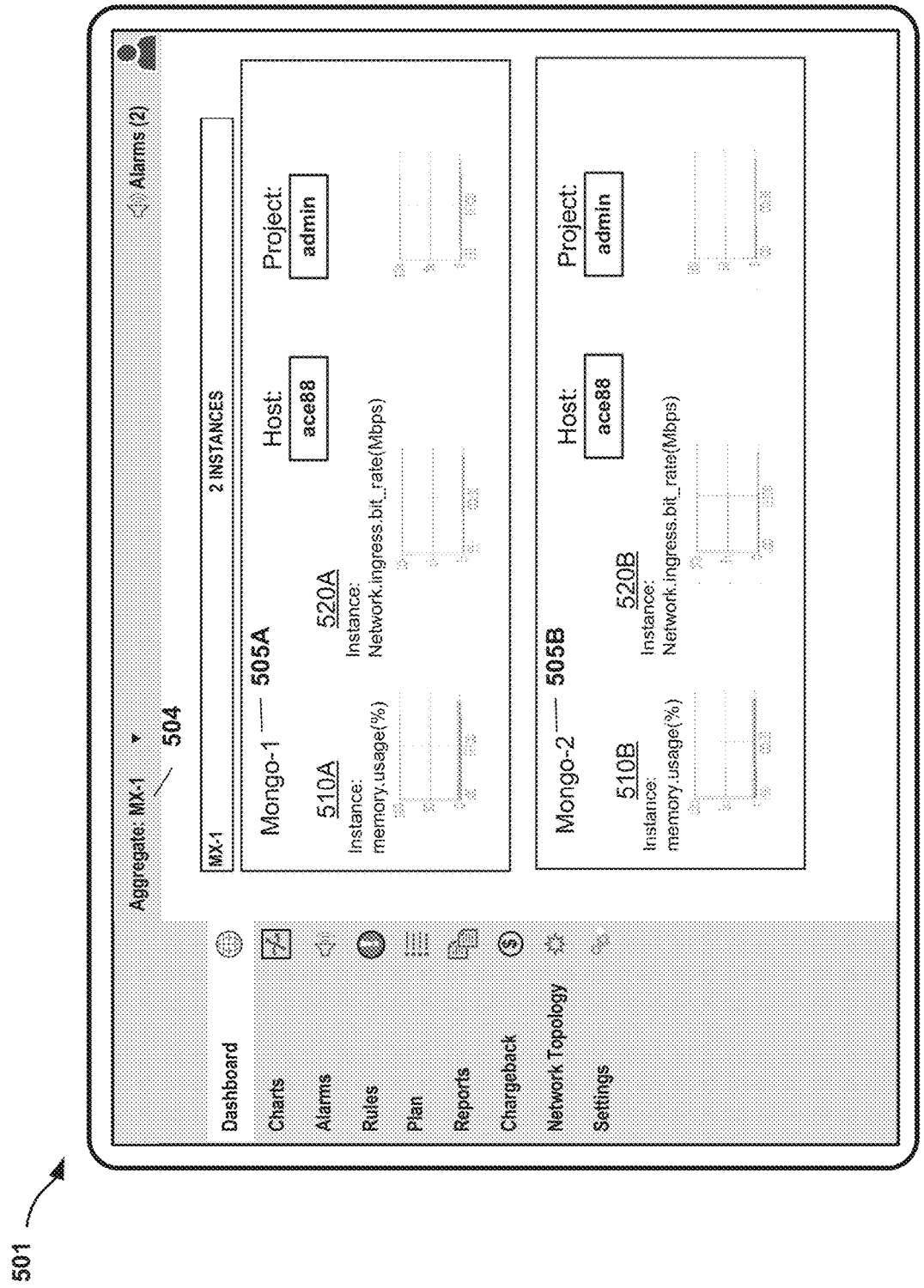
FIG. 5 illustrates an example user interface presented on a computing device, in accordance with one or more aspects of the present disclosure.

FIG. 5 is a conceptual diagram illustrating an example user interfaces presented by an example user interface device in accordance with one or more aspects of the present disclosure. User interface 501 illustrated in FIG. 5 may correspond to a user interface presented by user interface device 129, and may be an example user interface corresponding to or included within dashboard 203. Although user interface 501 illustrated in FIG. 5 is shown as graphical user interfaces, other types of interfaces may be presented by user interface device 129, including a text-based user interface, a console or command-based user interface, a voice prompt user interface, or any other appropriate user interface. One or more aspects of user interface 501 may be described herein within the context of data center 110.

In accordance with one or more aspects of the present disclosure, user interface device 129 may present user interface 501. For example, user interface device 129 may detect input that it determines corresponds to a request, by a user, to present metrics associated with control plane servers 160 and/or network devices 152. User interface device 129 may output to policy controller 201 an indication of input. Policy control engine 211 of policy controller 201 may detect input and determine that the input corresponds to a request for data about control plane usage metrics and/or data plane usage metrics associated with network device 152. Policy control engine 211 may, in response to the input, generate dashboard 203, which may include data underlying user interface 501. Policy control engine 211 may cause policy controller 201 to send data to user interface device 129. User interface device 129 may receive the data, and determine that the data includes data sufficient to generate a user interface. User interface device 129 may, in response to the data received from policy controller 201, create user interface 501 and present the user interface at a display associated with user interface device 129.

Policy controller 201 may tag the VMs with a particular tag or label corresponding to the network device for which VMs provide control plane functionality. User interface 501 may include a graphical element (e.g., an icon, text, etc.) indicating the tag or label 504. User interface 501 may include control plane usage metrics for each VM tagged with the label 501. In the example illustrated in FIG. 5, user interface 501 includes graphical elements (e.g., icons, text, etc.) indicating that virtual machines 505A, 505B, labeled as "Mongo-1" and "Mongo-2", respectively, are tagged with the label "MX-1." In other words, policy controller 201 may tag virtual machines 505A, 505B to indicate that virtual machines 505A, 505B provide control plane functionality for a particular network device with a label 504 of "MX-1".

In the example of FIG. 5, user interface 501 includes memory usage metrics graphs 510A, 510B and network ingress graph 520A, 520B, for respective instances of virtual machines 505A, 505B. Each graph in FIG. 5 may represent metric values (e.g., over time, along the x-axis), which may be associated with one or more virtual machines 505A, 505B executing on servers 160, network device 152 or a subset of forwarding units 56, or both. The metric values may be determined by policy controller 201 and/or policy agents 205, 206.

Figure 6:
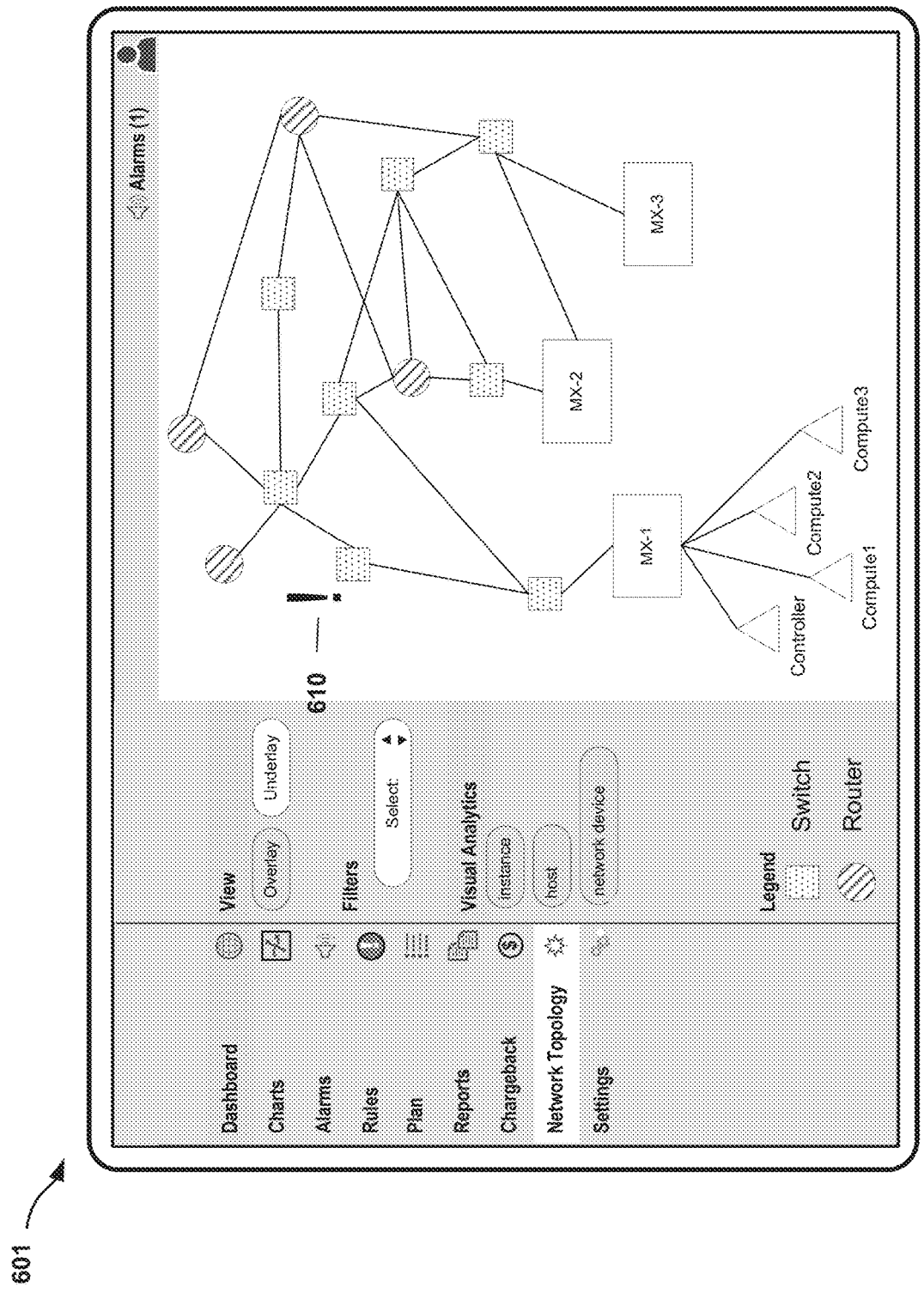
FIG. 6 illustrates an example user interface presented on a computing device, in accordance with one or more aspects of the present disclosure.

FIG. 6 is a conceptual diagram illustrating an example user interfaces presented by an example user interface device in accordance with one or more aspects of the present disclosure. User interface 601 illustrated in FIG. 6 may correspond to a user interface presented by user interface device 129, and may be an example user interface corresponding to or included within dashboard 203. Although user interface 601 illustrated in FIG. 6 is shown as graphical user interfaces, other types of interfaces may be presented by user interface device 129, including a text-based user interface, a console or command-based user interface, a voice prompt user interface, or any other appropriate user interface. One or more aspects of user interface 601 may be described herein within the context of data center 110.

In accordance with one or more aspects of the present disclosure, user interface device 129 may present user interface 601. For example, user interface device 129 may detect input that it determines corresponds to a request, by a user, to present a graph of the network topology. User interface device 129 may output to policy controller 201 an indication of input. Policy control engine 211 of policy controller 201 may detect input and determine that the input corresponds to a request for data about network topology. Policy control engine 211 may, in response to the input, generate dashboard 203, which may include data underlying user interface 601. Policy control engine 211 may cause policy controller 201 to send data to user interface device 129. User interface device 129 may receive the data, and determine that the data includes data sufficient to generate a user interface. User interface device 129 may, in response to the data received from policy controller 201, create user interface 601 and present the user interface at a display associated with user interface device 129.

In some examples, graphical user interface 601 may indicate an alarm for one or more network devices. In the example of FIG. 6, graphical user interface includes a graphical element 610 (e.g., an icon, such as an exclamation point) indicating an alarm for a network device.

FIG. 7 is a conceptual diagram illustrating an example user interfaces presented by an example user interface device in accordance with one or more aspects of the present disclosure. User interface 701 illustrated in FIG. 7 may correspond to a user interface presented by user interface device 129, and may be an example user interface corresponding to or included within dashboard 203. Although user interface 701 illustrated in FIG. 7 is shown as graphical user interfaces, other types of interfaces may be presented by user interface device 129, including a text-based user interface, a console or command-based user interface, a voice prompt user interface, or any other appropriate user interface. One or more aspects of user interface 701 may be described herein within the context of data center 110.

In accordance with one or more aspects of the present disclosure, user interface device 129 may present user interface 701. For example, user interface device 129 may detect input that it determines corresponds to a request, by a user, to present composite rules. User interface device 129 may output to policy controller 201 an indication of input. Policy control engine 211 of policy controller 201 may detect input and determine that the input corresponds to a request for data about composite rules. Policy control engine 211 may, in response to the input, generate dashboard 203, which may include data underlying user interface 701. Policy control engine 211 may cause policy controller 201 to send data to user interface device 129. User interface device 129 may receive the data, and determine that the data includes data sufficient to generate a user interface. User interface device 129 may, in response to the data received from policy controller 201, create user interface 701 and present the user interface at a display associated with user interface device 129.

Figure 8:
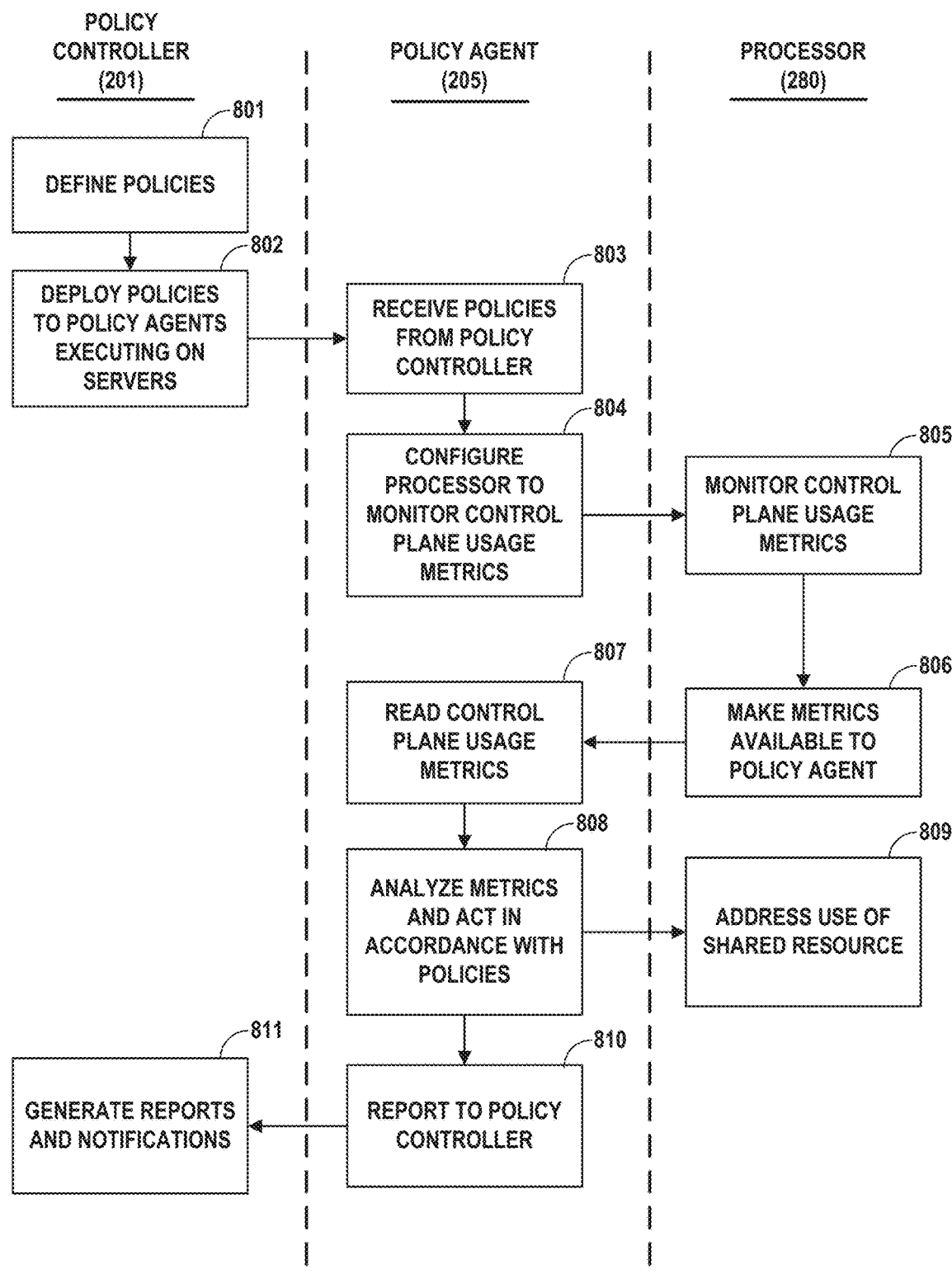
FIG. 8 is a flowchart illustrating example operations of one or more computing devices, in accordance with one or more aspects of the present disclosure.

FIG. 8 is a flow diagram illustrating operations of one or more computing devices, in accordance with one or more aspects of the present disclosure. FIG. 8 is described below within the context of network 105 of FIG. 1. In other examples, operations described in FIG. 8 may be performed by one or more other components, modules, systems, or devices. Further, in other examples, operations described in connection with FIG. 8 may be merged, performed in a difference sequence, or omitted.

In the example of FIG. 8, and in accordance with one or more aspects of the present disclosure, policy controller 201 may define one or more policies (801). For example, user interface device 129 may detect input, and output to policy controller 201 an indication of input. Policy control engine 211 of policy controller 201 may determine that the input corresponds to data sufficient to define one or more policies. Policy control engine 211 may define and store one or more policies in policies data store 202.

Policy controller 201 may deploy one or more policies to one or more policy agents 205 executing on one or more control plane servers 160 (802). For example, policy control engine 211 may cause data manager 218 of policy controller 201 to output data to policy agent 205. Policy agent 205 may receive the data from policy controller 201 and determine that the data corresponds to one or more policies to be deployed at policy agent 205 (803).

Policy agent 205 may configure processor 240 to monitor control plane usage metrics (804). In some examples, control plane usage metrics include processor metrics for resources internal to processor 240. For example, policy agent 205 may monitor control plane usage metrics, for example, by interacting with and/or configure monitoring circuit 252 to enable monitoring of processor metrics. In some examples, policy agent may configure monitoring circuit 252 to collect metrics pursuant to Resource Directory Technology.

Processor 240 may, in response to interactions and/or configurations by policy agent 205, monitor control plane usage metrics, including internal processor metrics relating to resources shared within the processor 240 of control plane server 160 (805). Processor 240 may make control plane usage metrics available to other devices or processes, such as policy agent 205 (806). In some examples, processor 240 makes such metrics available by publishing such metrics in a designated area of memory or within a register of processor 240.

Policy agent 205 may read control plane usage metrics, such as internal processor metrics (807). For example, policy agent 205 may read from a register (e.g., a model specific register) to access data about internal processor metrics relating to processor 240. As another example, policy agent 205 may read other control plane usage data, such as memory usage data.

Policy agent 205 may analyze the metrics and act in accordance with policies in place for control plane server 160 (808). For example, policy agent 205 may determine, based on the control plane usage metrics, that one or more virtual machines deployed on control plane server 160 is using a cache shared internal to processor 240 in a manner that may adversely affect the performance of other virtual machines 148 executing on control plane server 160. In some examples, policy agent 205 may determine that one or more virtual machines deployed on control plane server 160 is using memory bandwidth in a manner that may adversely affect the performance of other virtual machines 148. Policy agent 205 may, in response to such a determination, instruct processor 240 to restrict the offending virtual machine's use of the shared cache, such as by allocating a smaller portion of the cache to that virtual machine. Processor 240 may receive such instructions and restrict the offending virtual machine's use of the shared cache in accordance with instructions received from policy agent 205 (809).

In some examples, policy agent 205 may report data to policy controller 201 (810). For example, policy agent 205 may report control plane usage metrics to data manager 218 of policy controller 201. Alternatively, or in addition, policy agent 205 may report to data manager 218 results of analysis performed by policy agent 205 based on the control plane usage metrics.

In response to receiving data reported by policy agent 205, policy controller 201 may generate one or more reports and/or notifications (811). For example, analytics engine 214 of policy controller 201 may generate one or more reports and cause user interface device 129 to present such reports as a user interface. Alternatively, or in addition, analytics engine 214 may generate one or more alarms that may be included or reported in dashboard 203 presented by policy controller 201 via user interface device 129.

Figure 9:
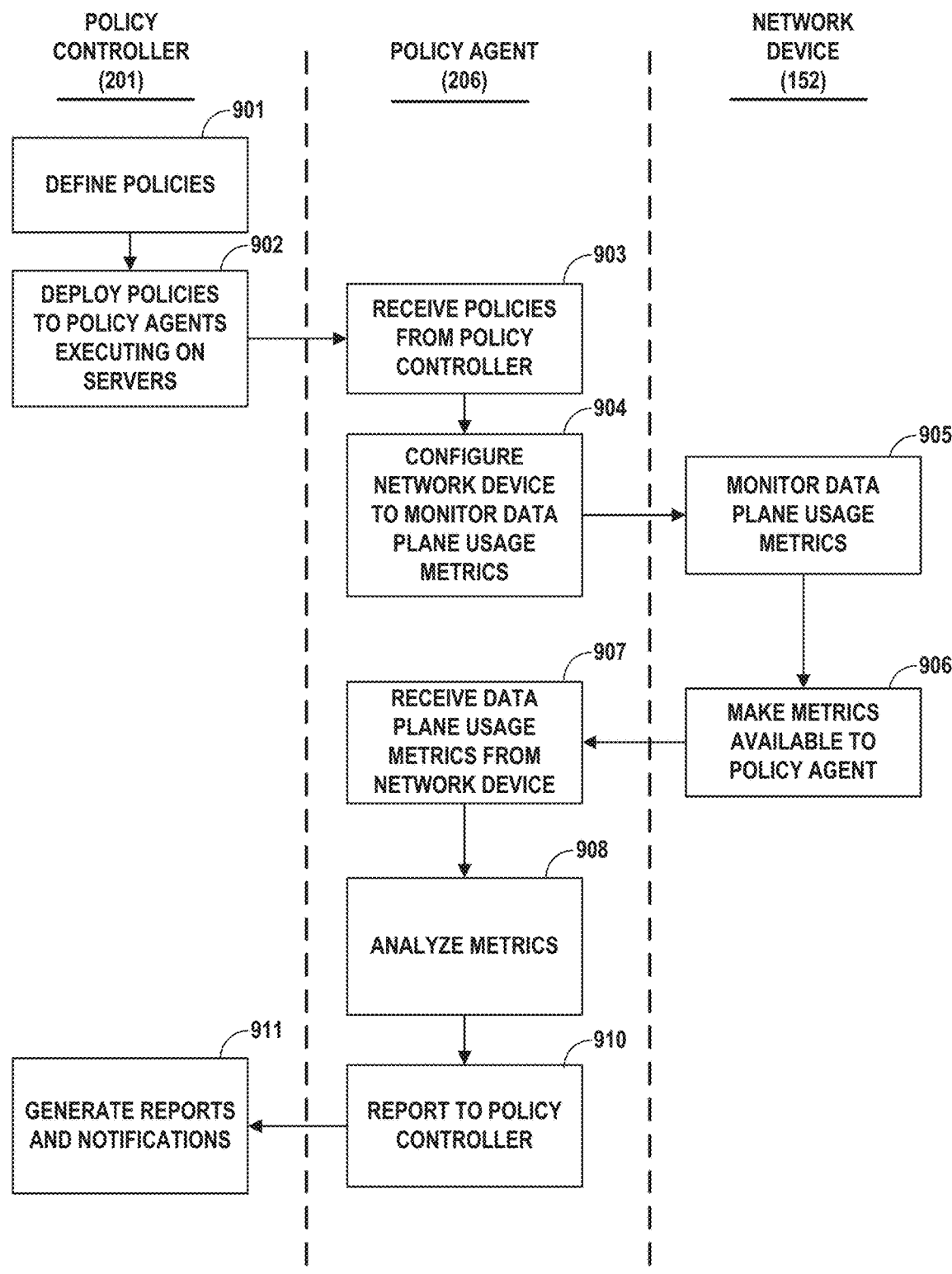
FIG. 9 is a flowchart illustrating example operations of one or more computing devices, in accordance with one or more aspects of the present disclosure.

FIG. 9 is a flow diagram illustrating operations of one or more computing devices, in accordance with one or more aspects of the present disclosure. FIG. 9 is described below within the context of network 105 of FIG. 1. In other examples, operations described in FIG. 9 may be performed by one or more other components, modules, systems, or devices. Further, in other examples, operations described in connection with FIG. 9 may be merged, performed in a difference sequence, or omitted.

In the example of FIG. 9, and in accordance with one or more aspects of the present disclosure, policy controller 201 may define one or more policies (901). For example, user interface device 129 may detect input, and output to policy controller 201 an indication of input. Policy control engine 211 of policy controller 201 may determine that the input corresponds to data sufficient to define one or more policies. Policy control engine 211 may define and store one or more policies in policies data store 202.

Policy controller 201 may deploy one or more policies to one or more policy agents 206 executing on one or more data plane proxy servers 162 (902). For example, policy control engine 211 may cause data manager 218 of policy controller 201 to output data to policy agent 206. Policy agent 206 may receive the data from policy controller 201 and determine that the data corresponds to one or more policies to be deployed at policy agent 206 (903).

Policy agent 206 may configure network device 152 to monitor data plane usage metrics (904). For example, policy agent 206 may interact with network device 152 to cause network device 152 monitor data plane usage metrics, also referred to as network device metrics, such as quantity dropped packets, network ingress statistics, network egress statistics, among others.

Network device 152 may, in response to interactions and/or configurations by policy agent 206, monitor data plane usage metrics (905). Network device 152 may make such metrics available to other devices or processes, such as policy agent 206 (906). In some examples, network device 152 makes the data plane usage metrics available by sending such metrics to data plane proxy servers 162.

Policy agent 206 may receive data plane usage metrics from network device 152 (907). For example, network device 152 may periodically push data plane usage metrics to policy agent 206. In some examples, policy agent 206 reads the data plane usage metrics from an area of memory of the network device.

Policy agent 206 may analyze the metrics (908). In some examples, policy agent 206 analyzes the data plane usage metrics to determine whether one or more control plane usage metrics satisfy a respective threshold defined by one or more policies. For example, policy agent 206 may determine, based on the data plane usage metrics, that network device 152 is dropping packets.

In some examples, policy agent 206 may report data to policy controller 201 (910). For example, policy agent 206 may report data plane usage metrics to data manager 218 of policy controller 201. Alternatively, or in addition, policy agent 206 may report to data manager 218 results of analysis performed by policy agent 206 based on data plane usage metrics for network device 152.

In response to receiving data reported by policy agent 206, policy controller 201 may generate one or more reports and/or notifications (911). For example, analytics engine 214 of policy controller 201 may generate one or more reports and cause user interface device 129 to present such reports as a user interface. Alternatively, or in addition, analytics engine 214 may generate one or more alarms that may be included or reported in dashboard 203 presented by policy controller 201 via user interface device 129.

Figure 10:
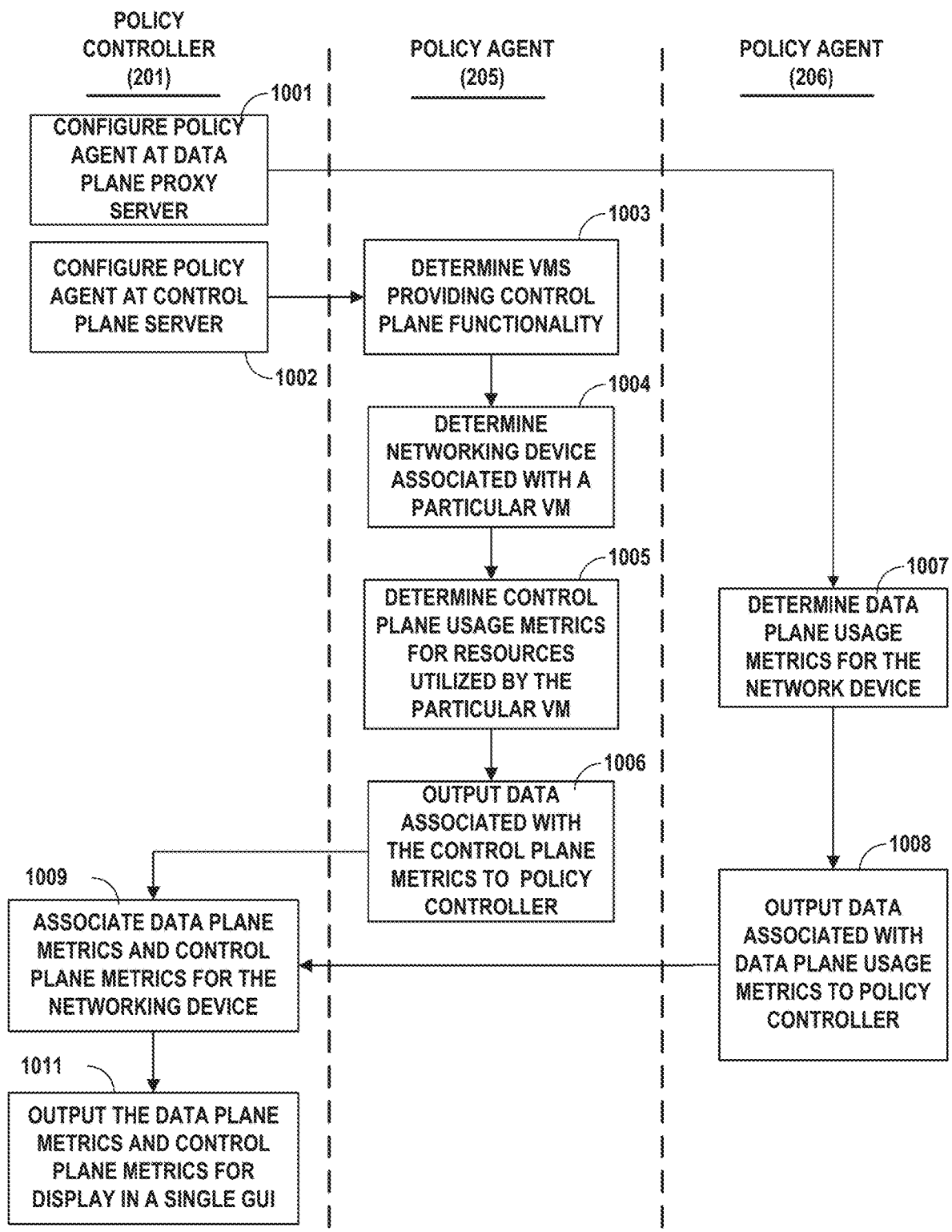
FIG. 10 is a flowchart illustrating example operations of one or more computing devices, in accordance with one or more aspects of the present disclosure.

FIG. 10 is a flow diagram illustrating operations of one or more computing devices, in accordance with one or more aspects of the present disclosure. FIG. 10 is described below within the context of network 105 of FIG. 1. In other examples, operations described in FIG. 10 may be performed by one or more other components, modules, systems, or devices. Further, in other examples, operations described in connection with FIG. 10 may be merged, performed in a difference sequence, or omitted.

In the example of FIG. 10, and in accordance with one or more aspects of the present disclosure, policy controller 201 may configure one or more policy agents at a data plane proxy server 162 (1001). For example, policy controller 201 may configure policy agent 206 by distributing one or more policies to the policy agent 206 of data plane proxy server 162.

Policy controller 201 may configure one or more policy agents at a control plane server 160 (1002). For example, policy controller 201 may configure policy agent 205 by instructing one or more policy agent 205 of control plane servers 160 to discover or determine virtual machines executing at the control plane servers 160 and/or distributing one or more policies to the policy agent 205.

Policy agent 205 of control plane servers 160 may determine one or more virtual machines providing control plane functionality for at least a subset of forwarding devices of a network device (1003). For example, policy agent 205 may call or invoke virtualization utilities 66 to execute a script to determine the identity of each virtual machine executing at each of control plane servers 160. Policy agent 205 may receive data identifying each virtual machine and data indicating a status of the virtual machine (e.g., "running" or "not running"). Agent 205 may determine whether each VM provides control plane functionality based on the status of the respective VM.

In some examples, policy agent 205 determines a network device or subset of forwarding units associated with a particular virtual machine 148 (1004). For example, policy agent 205 may call or invoke virtualization utilities 66 to execute a script to determine a unique identifier corresponding to a network machine or subset of forwarding units associated with the particular VM (e.g., 148A). As one example, agent 205 may invoke virtualization utilities 66 (e.g., inputting data identifying VM 148A) and may receive data uniquely identifying a network device associated with VM 148A.

Policy agent 205 may determine control plane usage metrics for resources used by the particular virtual machine (1005). In some instance, policy agent 205 invokes or calls virtualization utilities 66 to execute a script that returns control plane usage information associated with the VM 148A. For example, virtualization utilities 66 may, in response to being invoked by policy agent 205, return control plane usage metrics for VM 148A, such as memory usage or CPU usage, among others.

Responsive to determining the control plane usage metrics for resources utilized by a particular VM, policy agent 205 outputs data associated with the control plane usage metrics to policy controller 201 (1006). The data associated with the control plane usage metrics includes data identifying the network device or subset of forwarding units for which the VM provides control plane functionality. In some examples, the data associated with the control plane usage metrics includes all or a portion of the control plane usage metrics. As another example, policy agent 205 may analyze the control plane usage metrics to determine whether the control plane usage metrics for VM 148A satisfy a respective threshold defined by one or more of policies 202, such that the data associated with the control plane usage metrics may include data indicating whether the control plane usage metrics for VM 148A satisfy the respective threshold. In some examples, the data associated with the control plane usage metrics includes one or more tags associated with VM 148A (e.g., the tags previously provided to policy agent 205 by policy controller 201. Policy agent 205 outputs data associating VM 148A with the forwarding units for which the particular virtual machine provides control plane functionality. For example, policy agent may output a unique identifier corresponding to VM 148A and a unique identifier corresponding to network device 152 or a subset of forwarding units 56 for which VM 148A provides control plane functionality. For example, the data may include a mapping table or other data structure indicating the unique identifier for VM 148A corresponds to the unique identifier for network device 152 or subset of forwarding units 56.

Policy agent 206 of data plane proxy server 162 may determine data plane usage metrics for all of the forwarding units of the network device or a subset of forwarding units of the network device (1007). For example, policy agent 206 may receive data plane usage metrics and data identifying the network device or subset of forwarding units to which the data plane usage metrics correspond.

Responsive to determining the data plane usage metrics, policy agent 206 of data plane proxy server 162 may output data associated with the data plane usage metrics to the policy controller (1008). The data associated with the data plane usage metrics includes data identifying the network device or subset of forwarding units to which the data plane metrics correspond. In some examples, the data associated with the data plane usage metrics includes all or a subset of the data plane usage metrics. As another example, policy agent 206 analyzes the data plane usage metrics to determine whether one or more data plane usage metrics satisfies a respective threshold defined by one or more polices 202, such that the data associated with the data plane usage metrics includes data indicating whether one or more data plane usage metrics satisfies a respective threshold. In some examples, the data associated with the data plane usage metrics includes one or more tags associated with network device 152 or a virtual node of the network device (e.g., the tags previously provided to policy agent 205 by policy controller 201.

Policy controller 201 may associate the data plane usage metrics for network device 152 with the control plane usage metrics for network device 152 (1009). Policy controller 201 may associate data plane usage metrics and control plane usage metrics to generate a composite view of a virtual node. In other words, associating the data plane usage metrics and control plane usage metrics may enable policy controller to generate a user interface for a virtual node, such that a single UI for a virtual node may include data for the data plane and control plane of the same virtual node. In some examples, policy controller 201 may associate the data plane usage metrics corresponding to a particular network device or subset of forwarding units of the network device with the control plane usage metrics corresponding to a VM providing control plane functionality for the same network device or subset of forwarding units. For example, policy controller 201 may determine whether the identifying data received from agent 205 corresponds to (e.g., matches) the identifying data receive from agent 206. As another example, policy controller 201 may associate the data plane usage metrics and control plane usage metrics based on the tags. For example, policy controller 201 may tag VM 148A and/or the control plane usage metrics with a particular label or tag to associate VM 148A with a particular network device, such as a network device 152 labeled "MX-1". Similarly, policy controller 201 may tag data from policy agent 206 with a label or tag, for example, to indicate the data plane usage metrics correspond to network device 152 labeled "MX-1." Thus, policy controller 201 may associate the data plane usage metrics and data plane usage metrics. In other words, policy controller 201 may determine whether VM 148A provides control plane functionality for the same network device (or subset of forwarding units) as the network device (or forwarding paths) that generated the data plane usage metrics. Said yet another way, policy controller 201 may determine whether VM 148A and forwarding plane 56A represent the same virtual node (e.g., based on identifying data for VM 148 and identifying data for network device 152, or based on one or more tags). Responsive to determining that the identifying data received from agent 205 corresponds to (e.g., matches) the identifying data receive from agent 206, policy controller associates the data plane usage metrics and the control plane usage metrics for the network device or subset of forwarding units.

Responsive to associating the data plane usage metrics and the control plane usage metrics, policy controller 201 may output, for display, data indicative of the data plane usage metrics and the control plane usage metrics in a single graphical user interface (GUI) (1011). For example, the GUI may include graphs relating to one or more data plane usage metrics for network device 152 and one or more control plane usage metrics for the VM 148A providing control plane functionality for network device 152. In this way, policy controller 201 may enable a user to view data indicative of data plane usage metrics and control plane usage metrics for a virtual node. As another example, the GUI may include graphs relating to one or more control plane usage metrics for a plurality of VMs 148 providing control plane functionality for network device 152. In this way, policy controller 201 may enable a user to view data indicative of multiple VMs are associated with a network device. In some examples, the policy controller enables a user to tag VMs, network devices, and/or forwarding units, such that policy controller 201 may use the tags be used to identify performance of control plane features across different devices. By aggregating usage metrics (e.g., control plane usage metrics for multiple VMs, or control plane usage metrics and data plane usage metrics for a virtual node), policy controller 201 may enable a user to more easily view and monitor performance of resources with data center 110 in a single graphical user interface, such as GUIs 501, 601, and/or 701 of FIGS. 5-7, respectively.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A computing system comprising:
   a computing device configured to execute a plurality of virtual machines, each virtual machine of the plurality of virtual machines configured to provide control plane functionality for at least a different respective subset of physical forwarding units of a network device, the computing device distinct from the network device; and
   a policy agent configured to execute on the computing device, the policy agent configured to:
      determine that a particular virtual machine of the plurality of virtual machines provides control plane functionality for one or more physical forwarding units of the network device;
      determine control plane usage metrics for resources of the particular virtual machine; and
      output, to a policy controller, (i) data associated with the control plane usage metrics for resources of the particular virtual machine and (ii) data associating the particular virtual machine with a unique identifier of the one or more physical forwarding units for which the particular virtual machine provides control plane functionality, wherein the data associating the particular virtual machine with the unique identifier enables the policy controller to correlate the control plane usage metrics for resources of the particular virtual machine with data plane usage metrics for resources of the one or more physical forwarding units of the network device.

2. The computing system of claim 1, wherein the one or more physical forwarding units comprise a subset of a plurality of physical forwarding units of the network device, wherein the policy agent is further configured to:
   determine that the particular virtual machine provides control plane functionality for only the subset of the plurality of physical forwarding units, and
   wherein to output the data associating the particular virtual machine with a unique identifier of the physical forwarding units, the policy agent is configured to output, to the policy controller, data associating the particular virtual machine with the subset of the plurality of physical forwarding units.

3. The computing system of claim 1, wherein the one or more physical forwarding units comprise a first subset of a plurality of physical forwarding units of the network device, wherein the particular virtual machine is a first virtual machine, wherein the policy agent further configured to:
   determine that a second virtual machine of the plurality of virtual machines provides control plane functionality for a second subset of the plurality of physical forwarding units of the network device, the second subset distinct from the first subset; and
   output, to the policy controller, data associating the second virtual machine with the second subset of the plurality of physical forwarding units.

4. The computing system of claim 1, wherein the particular virtual machine is a first virtual machine, wherein the network device is a first network device, and wherein the policy agent is further configured to:
   determine that a second virtual machine of the plurality of virtual machines provides control plane functionality for one or more physical forwarding units of a second network device, the second network device distinct from the first network device; and
   output, to the policy controller, data associating the second virtual machine with a unique identifier of the one or more physical forwarding units of the second network device.

5. The computing system of claim 1, wherein the computing device is a first computing device, the policy agent is a first policy agent, and wherein the computing system further comprises:
   a dashboard software system; and
   a second computing device and a second policy agent configured to execute on the second computing device, the second policy agent configured to:
      monitor the data plane usage metrics for the resources of the one or more physical forwarding units of the network device;
      output, to the policy controller, data associated with the data plane usage metrics;
   the policy controller, wherein the policy controller is configured to:
      deploy one or more composite policies to the first computing device and the second computing device, the composite policies including control plane rulesets corresponding to the control plane usage metrics and data plane rulesets corresponding to the data plane usage metrics;
      determine, based on the data associated with the data plane usage metrics and the data associated with the control plane usage metrics, whether at least one composite policy of the one or more composite policies is satisfied; and
      responsive to determining that the at least one composite policy is satisfied, output, to the dashboard software system, an alarm, and
   wherein the dashboard software system is configured to output, for display by a user interface device, an indication of the alarm.

6. The computing system of claim 5,
   wherein the first policy agent is configured to evaluate the control plane usage metrics by application of the control plane rulesets, and wherein the data associated with the control plane usage metrics includes data indicating whether at least one of the control plane usage metrics satisfies a threshold defined by the control plane rulesets, and
   wherein the second policy agent is configured to evaluate the data plane usage metrics by application of the data plane rulesets, and wherein the data associated with the data plane usage metrics includes data indicating whether at least one of the data plane usage metrics satisfies a threshold defined by the data plane rulesets.

7. The computing system of claim 5,
wherein the policy controller is further configured to determine whether the data associated with the control plane usage metrics and the data associated with the data plane usage metrics are associated with the same network device;
responsive to determining that the data associated with the control plane usage metrics and the data associated with the data plane usage metrics are associated with the same network device, output, to the dashboard software system, data indicative of the data plane usage metrics, and
wherein the dashboard software system is further configured to output, for display in a single graphical user interface, the data indicative of the data plane usage metrics.

8. The computing system of claim 1, wherein the particular virtual machine is a first virtual machine, the computing system further comprising:
a dashboard software system,
wherein the policy agent is further configured to:
determine that a second virtual machine of the plurality of virtual machines provides control plane functionality for one or more physical forwarding units of the network device;
responsive to determining that the second virtual machine provides control plane functionality for the one or more physical forwarding units of the network device, determine control plane usage metrics for resources of the second virtual machine, and
wherein the dashboard software system is configured to output, for display in a single graphical user interface, data indicative of the control plane usage metrics corresponding to the first virtual machine and data indicative of the control plane usage metrics corresponding to the second virtual machine.

9. The computing system of claim 1, wherein the policy agent is further configured to determine whether the control plane usage metrics satisfy a threshold, wherein the data associated with the control plane usage metrics includes data indicating whether the control plane usage metrics satisfy a threshold, the computing system further comprising:
the policy controller, wherein the policy controller is configured to deploy policies to the policy agent and receive the data indicating whether the control plane usage metrics satisfy the threshold; and
a dashboard software system configured to output, for display, in a single graphical user interface, an indication of an alarm in response to receiving the data indicating the control plane usage metrics satisfy the threshold.

10. The computing system of claim 1, wherein determining that the particular virtual machine provides control plane functionality for the one or more physical forwarding units comprises:
determining an identifier for each virtual machine of the plurality of virtual machines; and
determining, based on the identifier for each respective virtual machine, an identifier corresponding to the network device.

11. A method comprising:
executing a plurality of virtual machines on a computing device, each virtual machine of the plurality of virtual machines configured to provide control plane functionality for at least a different respective subset of physical forwarding units of a network device, the computing device distinct from the network device;
determining, by a policy agent executing on the computing device, that a particular virtual machine of the plurality of virtual machines provides control plane functionality for one or more physical forwarding units of a network device;
determining, by the policy agent, control plane usage metrics for resources of the particular virtual machine; and
outputting, to a policy controller, (i) data associated with the control plane usage metrics for resources of the particular virtual machine and (ii) data associating the particular virtual machine with a unique identifier of the physical forwarding units for which the particular virtual machine provides control plane functionality, wherein the data associating the particular virtual machine with the unique identifier enables the policy controller to correlate the control plane usage metrics for resources of the particular virtual machine with data plane usage metrics for resources of the one or more physical forwarding units of the network device, wherein the one or more physical forwarding units of the network device and the particular virtual machine form a single virtual routing node that appears, to external network devices, as a single physical routing node in a network.

12. The method of claim 11, wherein the one or more physical forwarding units comprise a subset of a plurality of physical forwarding units of the network device, the method further comprising:
determining, by the policy agent, that the particular virtual machine provides control plane functionality for only the subset of the plurality of physical forwarding units; and
wherein outputting the data associating the particular virtual machine with a unique identifier of the physical forwarding units comprises outputting, by the policy agent and to the policy controller, data associating the particular virtual machine with the subset of the plurality of physical forwarding units.

13. The method of claim 11, wherein the one or more physical forwarding units comprise a first subset of a plurality of physical forwarding units of the network device, wherein the particular virtual machine is a first virtual machine, the method further comprising:
determining, by the policy agent, that a second virtual machine of the plurality of virtual machines provides control plane functionality for a second subset of the plurality of physical forwarding units of the network device, the second subset distinct from the first subset; and
outputting, by the policy agent and to the policy controller, data associating the second virtual machine with the second subset of the plurality of physical forwarding units.

14. The method of claim 11, wherein the particular virtual machine is a first virtual machine, wherein the network device is a first network device, the method further comprising:
determining, by the policy agent, that a second virtual machine of the plurality of virtual machines provides control plane functionality for one or more physical forwarding units of a second network device, the second network device distinct from the first network device; and
outputting, by the policy agent and to the policy controller, data associating the second virtual machine with a unique identifier of the one or more physical forwarding units of the second network device.

15. The method of claim 11, wherein the computing device is a first computing device, the policy agent is a first policy agent, the method further comprising:
monitoring, by a second policy agent configured to execute on a second computing device, the data plane usage metrics for the resources of the one or more physical forwarding units of the network device;
outputting, by the second policy agent and to the policy controller, data associated with the data plane usage metrics;
deploying, by the policy controller, one or more composite policies to the first computing device and the second computing device, the composite policies including control plane rulesets corresponding to the control plane usage metrics and data plane rulesets corresponding to the data plane usage metrics;
determining, by the policy controller, based on the data associated with the data plane usage metrics and the data associated with the control plane usage metrics, whether at least one composite policy of the one or more composite policies is satisfied;
responsive to determining that the at least one composite policy is satisfied, outputting, by the policy controller and to a dashboard software system, an alarm; and
outputting, by the dashboard software system and for display by a user interface device, an indication of the alarm.

16. The method of claim 15,
wherein the first policy agent is configured to evaluate the control plane usage metrics by application of the control plane rulesets, and wherein the data associated with the control plane usage metrics includes data indicating whether at least one of the control plane usage metrics satisfies a threshold defined by the control plane rulesets, and
wherein the second policy agent is configured to evaluate the data plane usage metrics by application of the data plane rulesets, and wherein the data associated with the data plane usage metrics includes data indicating whether at least one of the data plane usage metrics satisfies a threshold defined by the data plane rulesets.

17. The method of claim 15, the method further comprising:
determining, by the policy controller whether the data associated with the control plane usage metrics and the data associated with the data plane usage metrics are associated with the same network device;
responsive to determining that the data associated with the control plane usage metrics and the data associated with the data plane usage metrics are associated with the same network device, outputting, by the policy controller and to the dashboard software system, data indicative of the data plane usage metrics, and
outputting, by the dashboard software system and for display in the graphical user interface, the data indicative of the data plane usage metrics.

18. The method of claim 11, wherein the particular virtual machine is a first virtual machine, wherein the one or more forwarding units comprise a first subset of a plurality of forwarding units of the network device, the method further comprising:
determining, by the policy agent, that a second virtual machine of the plurality of virtual machines provides control plane functionality for a second subset of the plurality of forwarding units of the network device;
responsive to determining that the second virtual machine provides control plane functionality for the second subset of the plurality of physical forwarding units of the network device, determining, by the policy agent, control plane usage metrics for resources of the second virtual machine; and
outputting, by a dashboard software system, for display in a single graphical user interface, data indicative of the control plane usage metrics for resources of the first virtual machine and data indicative of the control plane usage metrics for resources of the second virtual machine.

19. The method of claim 18, wherein the first subset of the plurality of forwarding units and the first virtual machine operate as a first virtual routing node, and wherein the second subset of the plurality of forwarding units and the second virtual machine operate as a second virtual routing node, wherein each of the first virtual routing node and the second virtual routing node appears, to external network devices, as a respective single physical routing node in the network.

20. Non-transitory computer-readable storage media comprising instructions that, when executed by at least one processor of a computing device, cause the at least one processor to:
execute a plurality of virtual machines on the computing device, each virtual machine of the plurality of virtual machines configured to provide control plane functionality for at least a different respective subset of physical forwarding units of a network device, the computing device distinct from the network device;
determine that a particular virtual machine of the plurality of virtual machines provides control plane functionality for one or more physical forwarding units of a network device;
determine control plane usage metrics for resources of the particular virtual machine; and
output (i) data associated with the control plane usage metrics for resources of the particular virtual machine and (ii) data associating the particular virtual machine with a unique identifier of the one or more physical forwarding units for which the particular virtual machine provides control plane functionality, wherein the data associating the particular virtual machine with the unique identifier enables a policy controller to correlate the control plane usage metrics for resources of the particular virtual machine with data plane usage metrics for resources of the one or more physical forwarding units of the network device, wherein the one or more physical forwarding units of the network device and the particular virtual machine form a single virtual routing node that appears, to external network devices, as a single physical routing node in a network.

* * * * *